|                                                    | US007197711B1                                                                       |
| -------------------------------------------------- | ----------------------------------------------------------------------------------- |

(12) United States Patent
Crosbie et al.

(10) Patent No.: US 7,197,711 B1
(45) Date of Patent: Mar. 27, 2007

(54) TRANSFER OF IMAGES TO A MOBILE COMPUTING TOOL

(75) Inventors: John Crosbie, Fremont, CA (US); Shrikant Acharya, Fremont, CA (US); Gregory Springer, Fremont, CA (US); Shrinath Acharya, Fremont, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 624 days.

(21) Appl. No.: 10/066,402

(22) Filed: Jan. 31, 2002

(51) Int. Cl.
*G06T 1/00* (2006.01)
*G06F 13/10* (2006.01)

(52) U.S. Cl. .................. 715/732; 715/730; 715/748; 715/864; 345/625; 345/626

(58) Field of Classification Search .............. 715/511, 715/522, 513, 730, 732, 748, 864; 382/164, 382/166; 345/625, 626
See application file for complete search history.

(56) References Cited

U.S. PATENT DOCUMENTS

| 5,737,599 A * | 4/1998 | Rowe et al. ................ 707/10 |
| 5,963,968 A * | 10/1999 | Warmus et al. ............. 715/517 |
| 6,055,229 A * | 4/2000 | Dorenbosch et al. ....... 370/313 |
| 6,453,329 B1 * | 9/2002 | Dodgen ..................... 715/516 |
| 6,583,890 B1 * | 6/2003 | Mastie et al. ............. 358/1.18 |
| 2001/0013045 A1 * | 8/2001 | Loschky et al. ............ 707/530 |
| 2002/0034721 A1 * | 3/2002 | McManus et al. ........... 434/350 |
| 2003/0098819 A1 * | 5/2003 | Sukthankar et al. ......... 345/1.1 |

OTHER PUBLICATIONS

"Decompression", Nov. 4, 1998, Earthlink, pp. 1-3. Online at http://home.earthlink.net/~esmnet/decompression.htm.*

"Random Access", Jun. 2001, Presentations, p. 18. Online at http://www.presenter.com.cn/news/news_random_access.html.*

Jayant et al., "Digital Coding of Waveforms—Principles and Applications to Speech and Video"; Prentice-Hall Signal Processing Series; pp. vii-ix and 115-118.

Chastain, Sue, "Graphics Software," http://graphicssoft.about.com/library/glossary/bldefdithering.htm, Jan. 30, 2002, pp. 1-3.

"The LZ77 algorithm", http://www.rasip.fer.hr/research/compress/algorithms/fund/lz/lz77.html, Jan. 30, 2002, pp. 1-2.

"Version 13—Raster Imaging and Raster Imaging Pro", http://www.leadtools.com/home2/special/v13_emailer.htm, Jan. 30, 2002, pp. 1-4.

"Adobe Acrobat 5", http://www.adobe.com/products/acrobat/adobepdf.html, Jan. 24, 2002, pp. 1-2

* cited by examiner

*Primary Examiner*—Raymond J. Bayerl
*Assistant Examiner*—Namitha Pillai
(74) *Attorney, Agent, or Firm*—Brinks Hofer Gilson & Lione

(57) ABSTRACT

When a document generated from an application is printed, each page of the document is treated as a separate image Then, one or more templates are generated for a document, with each template containing common elements for a set of images in the document. For each set of images, sets of changes are identified. The templates and corresponding sets of changes to each image in a set of images may be reduced from one color space to another color space. The reduced templates and corresponding sets of changes are then compressed and formatted into a native file transfer format understood by a mobile computing tool, for transfer to a mobile computing tool, where the data is decompressed and images are rebuilt from the templates and corresponding sets of changes.

34 Claims, 18 Drawing Sheets

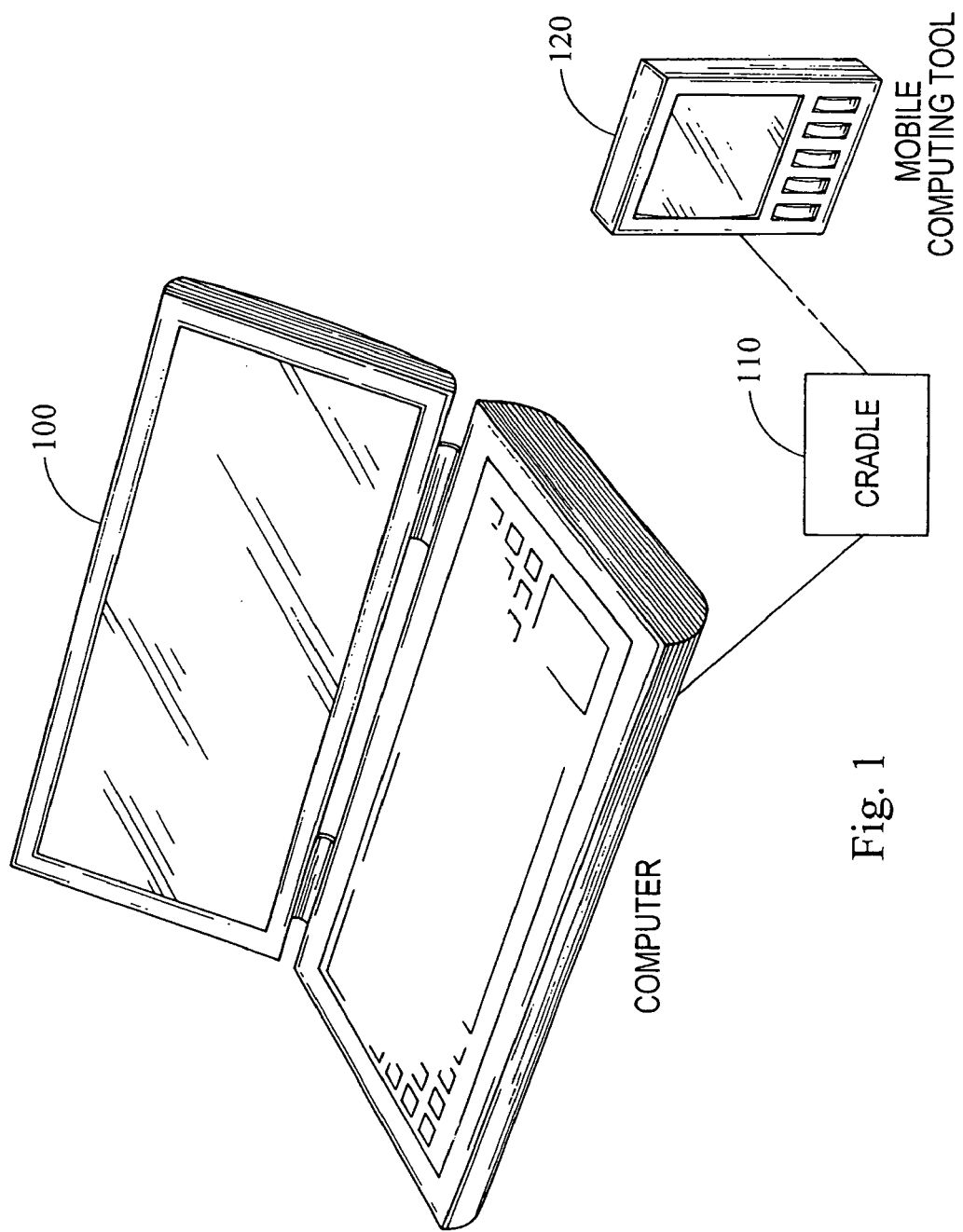

TRANSFER OF IMAGES TO A MOBILE COMPUTING TOOL

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO ATTACHED APPENDICES

Appendix A contains the following files in one CD-ROM (of which two identical copies are attached hereto), and is a part of the present disclosure and is incorporated by reference herein in its entirety:

cddir.txt

Volume in drive D is 020131—1423

Volume Serial Number is 0E56-9A8C

Directory of D:\

```
01/31/02   02:23p    <DIR>    .
01/31/02   02:23p    <DIR>    ..
01/31/02   02:00p              1,724    DDIHOO~1.CPP
01/31/02   01:58p             34,022    ENABLE~1.C2
01/31/02   01:57p                747    FILEOUT.H4
01/31/02   01:58p              5,486    FILEOU~1.CPP
01/31/02   01:57p             38,651    MACRO~1.TXT
01/31/02   01:57p              5,111    MGISTUFF.C6
01/31/02   01:56p                921    MGISTUFF.H7
01/31/02   01:56p             21,609    MIGDDRAW.C8
01/31/02   01:55p                764    MIGDDRAW.H9
              11 File(s)    109,035 bytes
Total Files Listed:
              11 File(s)    109,035 bytes
                                 0 bytes free
```

The files of Appendix A form source code of computer programs and related data of an illustrative embodiment of the present invention. In particular, Enable_prn.c enables and disables the invoking of an image print driver. DDIhook.c uses Direct Draw hook application programming interfaces (APIs) supplied by Microsoft with its operating systems to obtain bit maps of images. MACRO.txt is a plug-in for a PowerPoint® application that obtains the file attributes of the images, while MGIstuff.c is code that obtains file attributes for the images that are from other applications (e.g., a Word® application) that do not have a plug-in. Fileout.c includes routines to generate and store a file in a native file transfer format understood by a handheld device (e.g., .pdb). MGIDDraw.c includes slide viewer routines that enables viewing of slides on a handheld device that were generated from the images. Fileout.h, MGIDDraw.h, and MGIStuff.h are header files for the corresponding code files with the same names.

Appendix B contains pseudocode for (1) creating a template a set of changes to represent a document and for (2) generating slides from the template and the set of changes for viewing on a mobile computing tool. The pseudocode is a part of the present disclosure and is incorporated by reference herein in its entirety.

CROSS REFERENCE TO RELATED APPLICATIONS

This document is related to and incorporates by reference herein in its entirety the following U.S. patent application: Ser. No. 10/066,330 entitled "Recognition of a Remote Control Signal by a Handheld Device," by John Crosby et al., filed concurrently herewith.

BACKGROUND

Recent advances in digital technology along with the shift in the focus of the consumer electronics industry to smaller, portable computing devices has resulted in the development and increasing use of mobile computing tools. Mobile computing tools include Personal Digital Assistants (PDAs), handheld personal computers (PCs), and mobile computing devices.

Some examples of PDAs available for purchase include a Handspring™ Visor from Handspring, Inc. of Mountain View, Calif.; a Palm™ PDA from Palm, Inc., of Santa Clara, Calif. using the Palm™ OS (operating system); and an iPAQ from Compaq Computer Corp. of Houston, Tex. using the Pocket PC operating system from Microsoft Corporation. Some examples of handheld personal computers include Jornada 720 or Jornada 790 Pocket PCs from Hewlett Packard Co. of Palo Alto, Calif. using a Windows® CE operating system from Microsoft. Some examples of mobile computing devices include a PC-EPhone™ device from PC-EPhone of San Diego, Calif.

A mobile computing tool is a small computer-like device that typically is encased in a small housing and may include a miniature keypad and a small display screen. A mobile computing tool is typically provided with an operating system and may be provided with one or more applications, such as a word processing application (e.g., Microsoft® Word®), a spreadsheet application (e.g., Microsoft® Excel®), or a presentation application (e.g., PowerPoint®). Mobile computing tools are sometimes small enough to fit in the palm of a hand or within a shirt pocket. Due to the decreased size of the mobile computing tool, there is also decreased power and memory at the mobile computing tool.

Data (e.g., a presentation) from a computer, such as a laptop computer or a personal computer (PC), may be transferred to the mobile computing tool via, for example, wireless technology (e.g., Bluetooth technology) or via a cradle attached to the computer that may hold the mobile computing tool. Unfortunately, transferring large amounts of data, such as a presentation having multiple pages, is time consuming. Often the presentations are prepared using a PowerPoint® application, and the presentations are inherently large files that lead to a waste of valuable memory space on the mobile computing tool.

Some users convert data on a computer to a Portable Document Format (PDF) available from Adobe Systems, Inc. of Seattle, Wash. Documents may be converted to PDF using Adobe Acrobat® 5.0 software and transferred from a computer to a mobile computing tool, where the document may be read with an Adobe Acrobat® Reader®. For more information, see http://www.adobe.com/products/acrobat/adobepdf.html. The use of PDF, however, still requires transfer of large amounts of data that leads to a waste of valuable memory space on the mobile computing tool.

Some users generate an image at a computer and compress the image using a JPEG ("Joint Photographic Experts Group") compression scheme. The compressed file is then transferred from a computer to a PDA. JPEG is a lossy compression technique (i.e., a technique in which some data is lost during compression) for color images. Use of JPEG compression does not avoid the problem of transferring the same data multiple times.

SUMMARY

In accordance with the invention, when a document generated from an application (e.g., a Microsoft® PowerPoint® application, a Microsoft® Word® application or a Microsoft® Excel® application) is printed, each page of the document is treated as a separate image (i.e., a bit map output by the application).

Then, one or more templates are generated for the document, with each template containing common elements for a set of images in the document. The set of images may include a portion or all of the images in the document. For each set of images, sets of changes are identified. In some embodiments, each set of changes identifies differences between the image and the template. In some embodiments, each set of changes identifies differences between a current image and a previous image in the set of images, with the set of changes for the first image in the set identifying differences between the first image and the corresponding template.

In some embodiments, the templates and corresponding sets of changes to each image in a set of images may be reduced from one color space (e.g., a 24-bit color space in which each pixel is represented by 24 bits) to another color space (e.g., an 8-bit color space in which each pixel is represented by 8 bits). The reduced templates and corresponding sets of changes may then be compressed and formatted into a native file transfer format understood by a mobile computing tool. The compressed and formatted templates and corresponding sets of changes are referred to herein as a "mobile presentation." In some embodiments, mobile presentations generated from different applications may be appended together to form a new mobile presentation.

The mobile presentation may be transferred to a mobile computing tool, where the data is decompressed and slides are built from the templates and corresponding sets of changes.

BRIEF DESCRIPTION OF THE DRAWINGS

FIG. 1 illustrates, in a block diagram, a laptop computer having a cradle for a mobile computing tool in accordance with some embodiments of the invention.

DETAILED DESCRIPTION

Figure 2A:
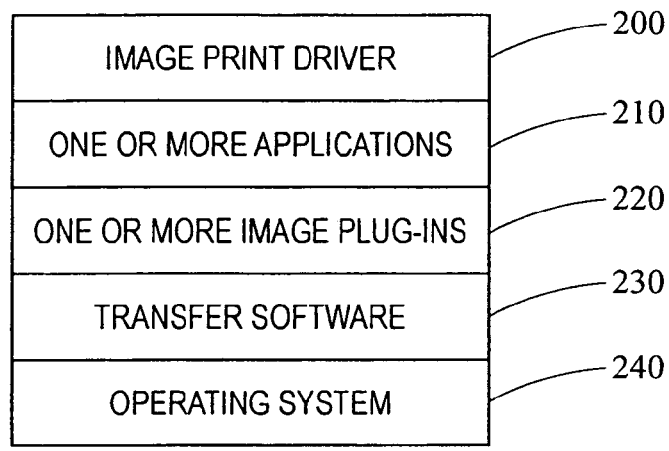
FIGS. 2A–2B illustrate, in block diagrams software configurations at a computer and a mobile computing tool, respectively, in accordance with some embodiments of the invention.

In accordance with the invention, when a document generated from an application (e.g., a Microsoft® PowerPoint® application, a Microsoft® Word® application or a Microsoft® Excel® application) is printed, each page of the document is treated as a separate image (i.e., a bit map output by the application). The images are processed to reduce the amount of data that needs to be transmitted from the computer to a mobile computing tool in order to enable a user to view the images as slides on the mobile computing tool.

Specifically, in some embodiments of the invention, a computer is programmed with software (also referred to as an "image print driver") that processes images in a document to generate one or more templates (also referred to as "master slides") and corresponding sets of changes (also referred to as "masks"). Each master slide includes common elements for a set of the images. The set of images may include a portion or all of the images in a document. Thus, a set of images may have one or more master slides. For example, in a set of six images, one master slide may be common to two of the six images, while another master slide may be common to the remaining four of the six images. The masks include non-common (i.e., image specific) elements. In some embodiments, each mask corresponds to a master slide and identifies differences between the image and the master slide. In some embodiments, each mask corresponds to a master slide and identifies differences between a current image and a previous image in the set of images, with the mask for the first image in the set identifying differences between the first image and the corresponding master slide. Each mask may represent zero or more changes.

In some embodiments, to reduce the amount of data to be compressed, the image print driver converts the master slides and corresponding masks from one color space (e.g., a 24-bit pixel color space) to another color space (e.g., an 8-bit pixel color space) using color dithering, depending on the requirements of an application. For example, a 24-bit pixel color space may be reduced to a 16-bit pixel color space, a 32-bit pixel color space may be reduced to an 8-bit pixel color space, a 32-bit pixel color space may be reduced to a 16-bit pixel color space, or a 32-bit pixel color space may be reduced to a 24-bit pixel color space. In some embodiments, the color space is not reduced. In some embodiments, an 8-bit pixel color space is used per image to generate a standard presentation.

The converted master slides and corresponding masks may be compressed and formatted into a native file transfer format (also referred to as a "mobile presentation format") that the mobile computing tool understands. This compressed and formatted data is referred to herein as a "mobile presentation." Thus, instead of transferring separate 24-bit pixel images to a mobile computing tool, the image print driver transfers one mobile presentation that includes the one or more master slides and corresponding masks in a native file transfer format.

In some embodiments of the invention, a mobile computing tool is programmed with software (also referred to as a "slide viewer") that enables the mobile computing tool to receive compressed data in a native file transfer format, decompress the data, and build slides using the one or more master slides and corresponding masks.

In particular, in some embodiments, slides may be rebuilt by applying each mask (i.e., in a set of masks that corresponds to a set of images) to the same master slide. In some embodiments, slides may be rebuilt by applying each mask to a previously rebuilt slide, with the first mask being applied against a corresponding master slide to generate a first slide.

By generating master slides and masks, the image print driver reduces the amount of data transferred from the computer to the mobile computing tool and reduces the amount of data to be stored on the mobile computing tool. The image print driver also avoids transferring common elements multiple times to the mobile computing tool.

In some embodiments, an application may be provided with a plug-in (also referred to as an "image plug-in") that generates master slides and corresponding masks, performs color reduction, compresses the data, and formats the data so that it is understood by a mobile computing tool.

In some embodiments, mobile presentations generated from different applications may be appended together to form one document.

FIG. 1 illustrates, in a block diagram, a laptop computer 100 having a cradle 110 for a mobile computing tool 120 in accordance with some embodiments of the invention. A mobile computing tool may be a PDA, a handheld PC, or a mobile computing device. A mobile computing tool 120 may be placed in the cradle 110 to receive data that is transferred from the laptop computer 100. In some embodiments, the laptop computer 1100 transfers data to the mobile computing tool 120 via wireless technology (e.g., Bluetooth technology) or infrared radiation (IR) technology. In some embodiments, the mobile computing tool 120 may be connected via a cable to a projector to enable the data on the mobile computing tool 120 to be projected onto a projection screen.

Laptop computer 100 may instead be any special or general purpose computer, such as a Pentium™-based computer, available from a variety of third parties, an UltraSparc™ workstation, available from Sun Microsystems, Inc. of Mountain View, Calif., an RS6000 workstation, available from IBM of Armonk, N.Y., a Macintosh™ computer, available from Apple Computer, Inc. of Cupertino, Calif., etc. The computer 100 may include 32 MB RAM and a 50 MB Hard Drive.

The mobile computing tool cradle 110 may be loaded with transfer software, such as ActiveSync® software or PC Connect software from Microsoft, Corp., or HotSync® software from Palm, Inc. The transfer software is used to transfer data from the computer 100 to the mobile computing tool 120.

The display device may be one with a HD-15 (VGA) connector and support for 1024×768 resolution analog RGB (red green blue), such as most CRT monitors and graphics projectors.

The mobile computing tool 120 may be, for example, one that runs the Microsoft® Pocket PC operating system and that has a Type II PC card or CF card slot or jacket adapter with card adapter interface.

FIG. 2A illustrates a software configuration of a computer 100, in accordance with an embodiment of the invention. During operation of computer 100, an image print driver 200, one or more applications 210 (e.g., a Microsoft® PowerPoint® application, a Microsoft® Word® application or a Microsoft® Excel® application), one or more image plug-ins 220 that work in conjunction with an application (e.g., a Microsoft® PowerPoint® application), and transfer software 230 (e.g., Microsoft® ActiveSync® software) are executed on top of operating system 240.

Figure 2B:
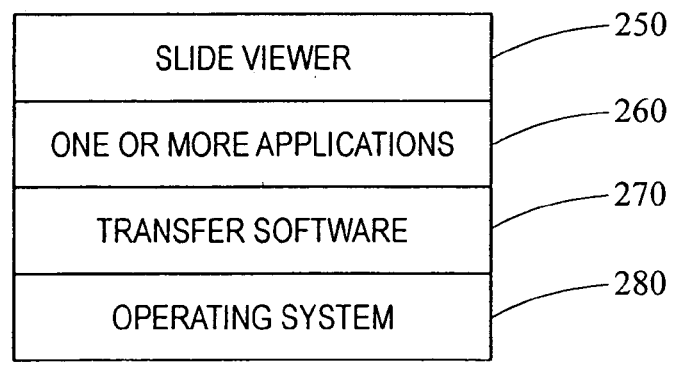

FIG. 2B illustrates a software configuration of a mobile computing tool 120, in accordance with an embodiment of the invention. During operation of computer 100, a slide viewer 250, one or more applications (e.g., a Microsoft® PowerPoint® application, a Microsoft® Word® application or a Microsoft® Excel® application) 260, and transfer software 270 (e.g., Microsoft® ActiveSync® software) are executed on top of operating system 280.

Operating system 240 may be any suitable operating system, such as Windows® 98, Windows® 98SE, Windows® Millennium, Windows® 2000, Windows® XP, or Windows® NT 4.0, available from Microsoft Corp. of Redmond, Wash.

Operating system 280 may be any suitable operating system, such as a Palm OS from Palm, Inc., a Pocket PC operating system from Microsoft, Corp., or a Symbian operating system from Symbian, Ltd. of London, UK.

Figure 3:
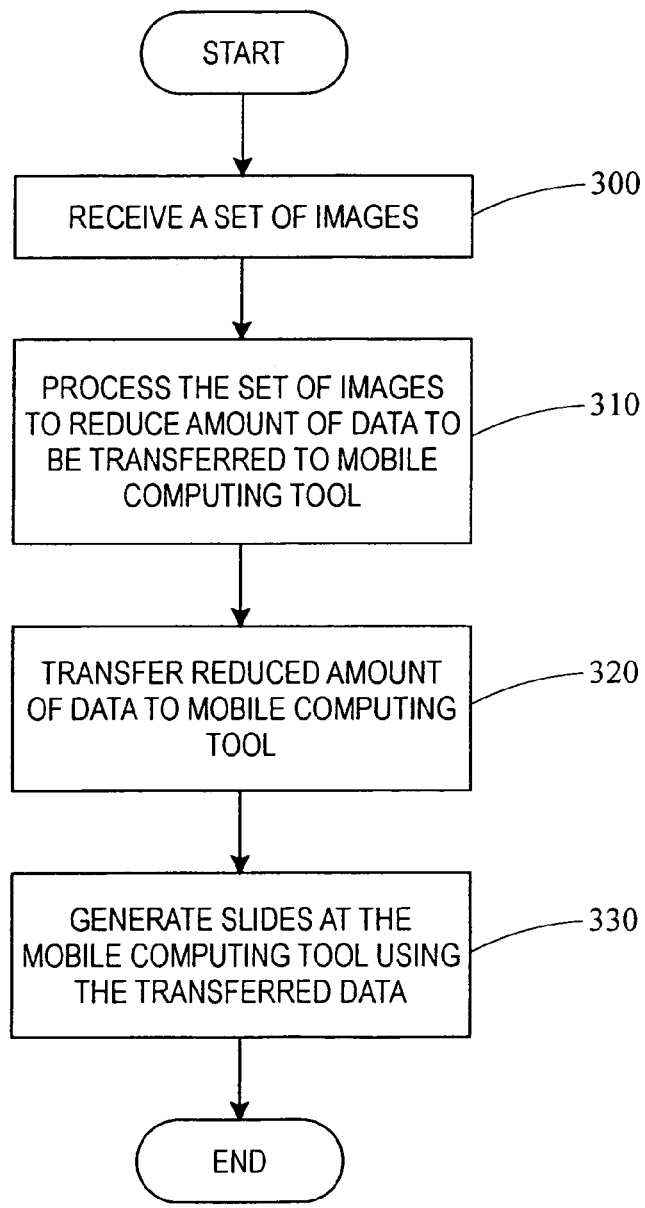
FIG. 3 illustrates, in a flow chart, acts performed by a computer and a mobile computing tool, each programmed in accordance with some embodiments of the invention to perform image transfer and rebuilding.

FIG. 3 illustrates, in a flow chart, acts performed by a computer and a mobile computing tool, each programmed in accordance with some embodiments of the invention to perform image transfer and rebuilding. Act 300 represents the receipt of a set of images. In some embodiments, a user may generate a document using an application (e.g., a Microsoft® Word® application) and may invoke the image print driver 200 via a Print command. At this time, the image print driver 200 treats each page of the document as an image, resulting in a set of images for the document.

Act 310 represents the image print driver 200 processing the set of images to reduce the amount of data that is to be transmitted to a mobile computing tool. This processing includes creation of one or more master slides and masks, as well as, optionally, a reduction from a 24-bit color scheme to an 8-bit color scheme using color dithering and compression of the data. Act 320 represents the transfer of the reduced amount of data to the mobile computing tool 120 from the computer 100. Act 330 represents the slide viewer 250 generating slides at the mobile computing tool 120 from the transferred data.

Thus, using the image print driver 200, a user can compress and load images from documents (e.g., a PowerPoint® or Word document) from a computer 100 into a mobile computing tool 120 using transfer software. The user can then carry the mobile computing tool, for example, to a conference, connect to a digital projector or VGA display, and make 1024×768 color presentations without the need for a laptop or other computer.

Figure 4A:
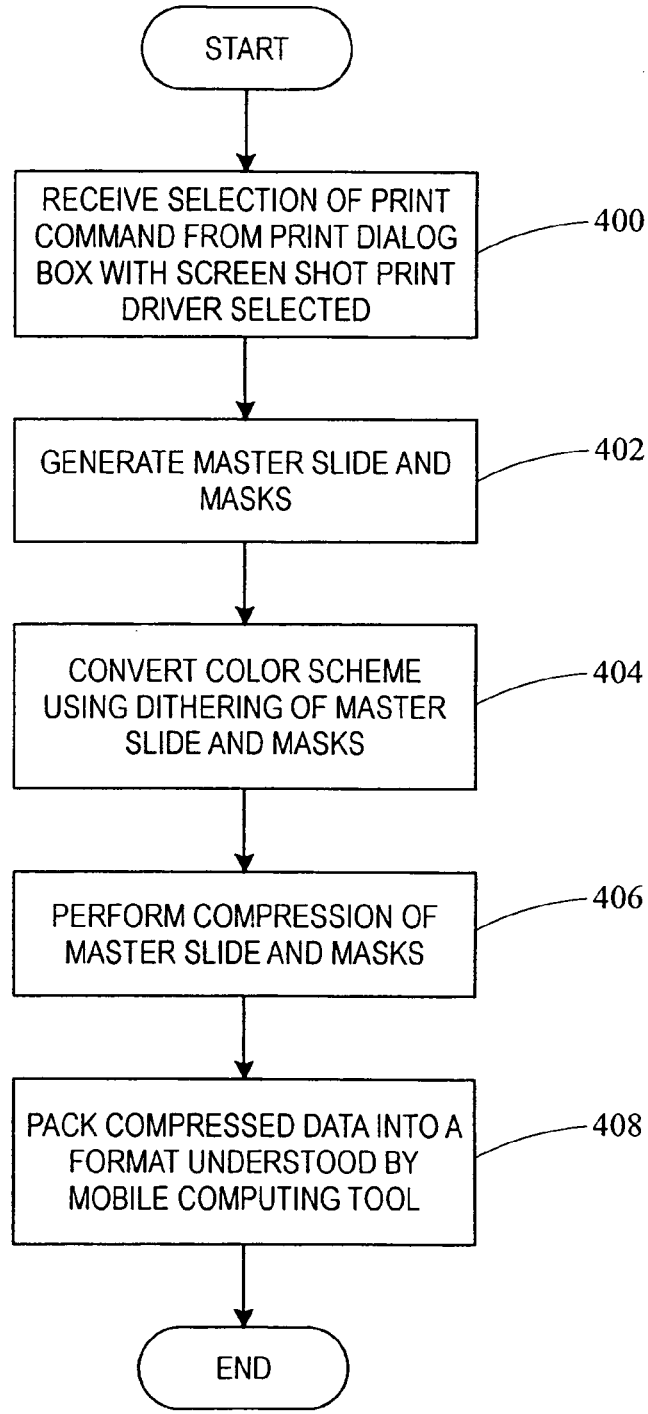
FIG. 4A illustrates, in a flow chart, acts performed by a computer programmed in accordance with some embodiments of the invention to generate a mobile presentation.
Figure 5:
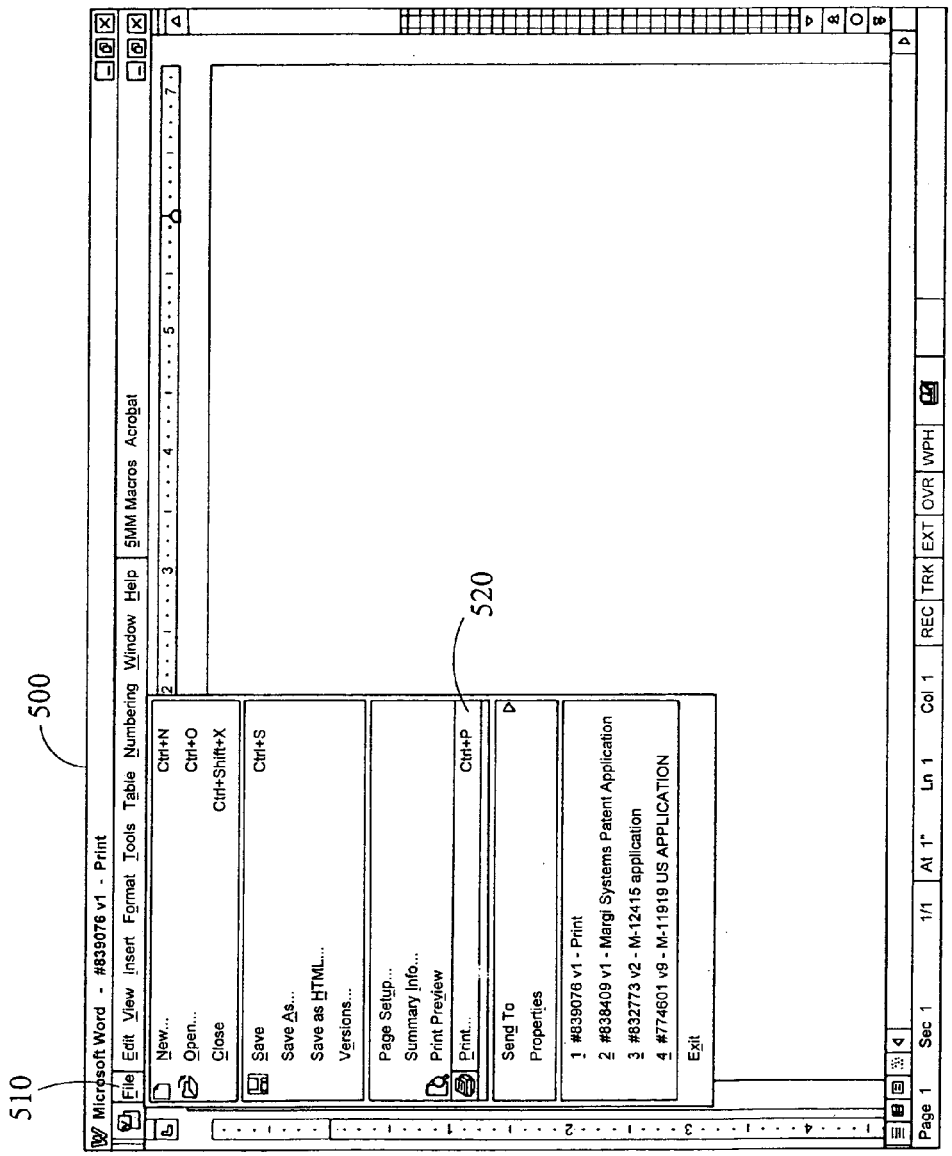
FIG. 5 illustrates, in a block diagram, selection of a Print sub-menu in accordance with some embodiments of the invention.

FIG. 4A illustrates, in a flow chart, acts performed by a computer 100 programmed in accordance with some embodiments of the invention to perform image processing. Act 400 represents the image printer driver 200 receiving selection of a Print command from a user via a Print dialog box with the image print driver 200 selected. The Print dialog box may be displayed when a user selects a File menu and a Print sub-menu of an application. FIG. 5 illustrates, in a block diagram, selection of a Print sub-menu 520 in accordance with some embodiments of the invention. In particular, a Microsoft® Word® document is displayed in window 500 by a Microsoft® Word® application. To print an image, a user selects the File menu 510 and Print sub-menu 520. In response to the selection of the print command, a Print dialog box 600 is displayed.

Figure 6:
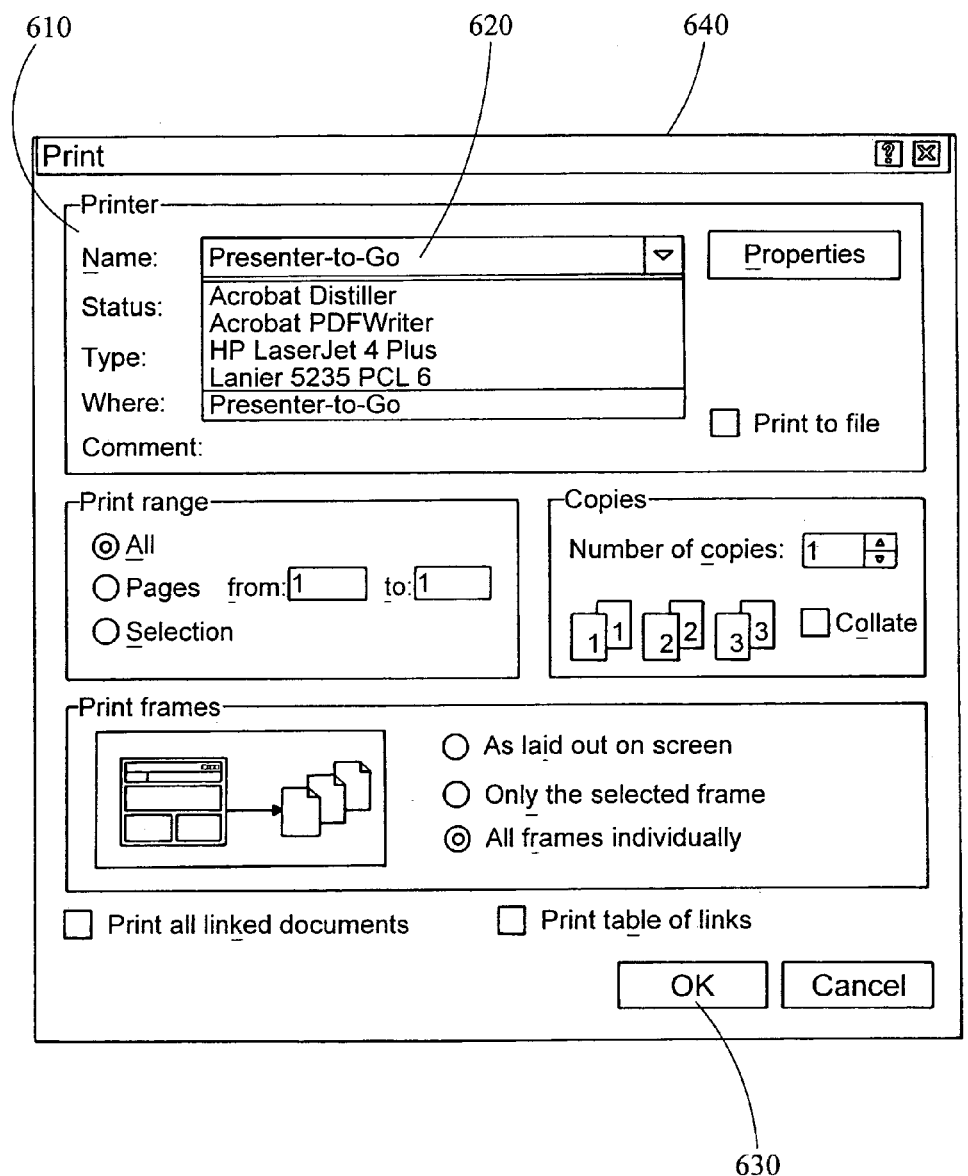
FIG. 6 illustrates, in a block diagram, a Print dialog box in accordance with some embodiments of the invention.

FIG. 6 illustrates, in a block diagram, a Print dialog box 600 in accordance with some embodiments of the invention. The Print dialog box 600 allows selection of the image print driver 200 (labeled as "Presenter-to-go" 620) in the printer selection area 610. If a user selects the image print driver 200 and selects the "OK" button 630, the image print driver 200 will generate a 24-bit image of the document from which the Print command was selected. In some embodiments, the 24-bit image is in the "LANDSCAPE" orientation. Each page of the document is treated as an image. If the size of the a page of the document exceeds, for example, a printer page (e.g., 8½ by 11 inches), then the image print driver 200 saves the balance of the page as additional images until all of the material on the page of the document is captured in at least one image.

In some cases, Microsoft® Windows® operating system sets the image printer driver 200 to the PORTRAIT orientation. In that case, a user may manually choose the "properties" of the image printer driver 200 and change the orientation to the LANDSCAPE mode. For a PowerPoint® presentation, the default orientation is typically "LANDSCAPE."

Once the image print driver 200 is selected, the image print driver 200 is enabled via routines in the Enable_prn.c code attached in Appendix A. Then, the Direct Draw API is invoked within the DDIhook.c code attached in Appendix A to capture bit maps of the output of one application and transfer them to the image print driver 200. Next, if an image plug-in 220 is not available for the application, the MGIS-tuff.c code attached in Appendix A extracts features from the images, such as titles for each image. If an image plug-in 220 is available, the MACRO.txt code attached in Appendix A performs this extraction. At this time, the bit map images are ready for further processing.

Figure 7:
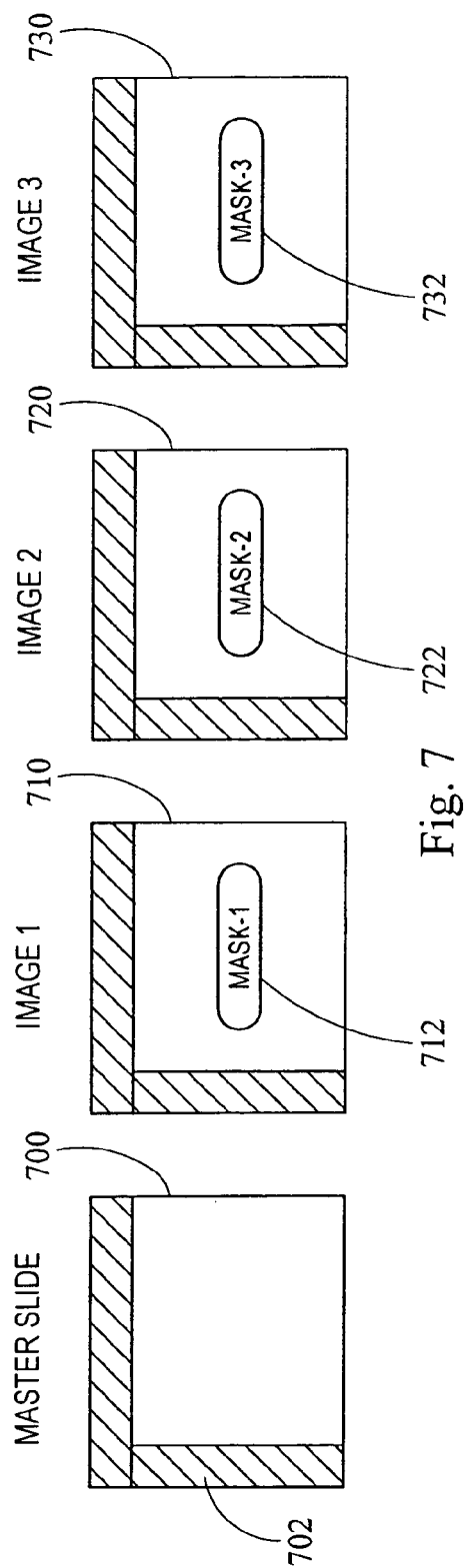
FIG. 7 illustrates, in a block diagram, a set of images in accordance with an embodiment of the invention.

Act 402 represents the image print driver 200 generating a master slide and masks based on a document. In some embodiments, common elements are identified in a set of images by comparing corresponding pixels across the images. For example, if the pixel at location (5,10) has the same RGB value in each of the images in the set of images, that pixel is considered to be a common element and is included in the master slide. FIG. 7 illustrates, in a block diagram, a set of images 710, 720, and 730 in accordance with an embodiment of the invention. The image print driver 200 identifies common elements in images 710, 720, and 730, and the common elements are represented by area 702 of master slide 700. The image print driver 200 also identifies unique (non-common) elements of each image 710, 720, and 730. The unique elements are mask-1 712 in image 710, mask-2 722 in image 720, and mask-3 732 in image 730.

Act 404 represents the image print driver 200 converting the 24-bit color scheme of the master slide and masks into an 8-bit color scheme using color dithering, in accordance with an embodiment of the invention. In some embodiments of the invention, a Raster Imaging Pro product available from Lead Technologies, Inc. of Charlotte, N.C. may be used to perform color reduction with or without color dithering. For more information on color reduction and/or color dithering, see http://gragphicssoft.about.com/library/glossary/bldefdithering.htm, which is entirely incorporated by reference herein.

Figure 8:
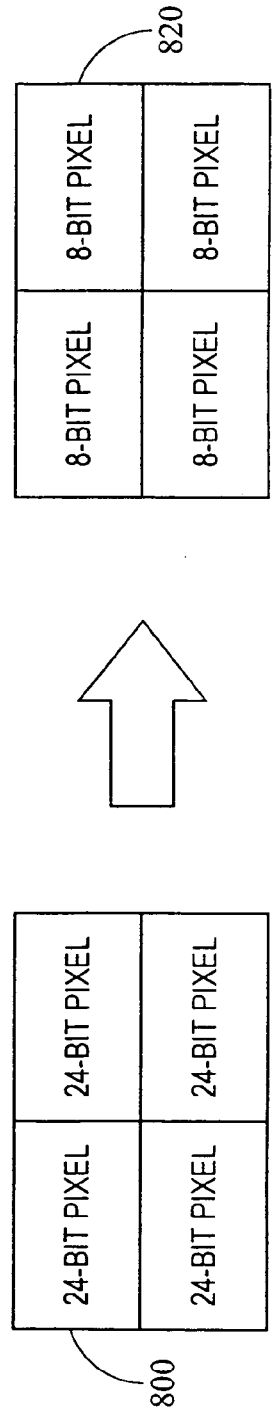
FIG. 8 illustrates, in a block diagram, pixels of an image in accordance with embodiments of the invention.

FIG. 8 illustrates, in a block diagram, pixels of an image in accordance with embodiments of the invention. The 24-bit pixels 800 may represent millions of colors, while the 8-bit pixels 820 may represent 256 colors. Thus, a color in the 24-bit color scheme may not exist in the 8-bit color scheme. The reduction from the 24-bit color scheme uses color dithering to smooth quantization errors created by the color reduction process. Quantization errors refer to errors in mapping a color in the 24-bit color scheme to a color in the 8-bit color scheme. In pulse code modulation techniques or image transformation, quantization error is an error in signal representation introduced by assigning a corresponding discrete value for a sampled signal that falls with a given subrange. Quantization results in introducing signal distortion. For more information, see "Digital Encoding of Waveforms, Principles and Application to Speech and Video", by N. S. Jayant and Peter Noll, Published by Prentice-Hall Signal Processing Series, Alan V. Oppenheim, Series Editor, 1984 ISBN 0-13-211913-7 01, pp. 118, 161, and 374, 1984, which is entirely incorporated by reference herein. In particular, color dithering attempts to create a pattern of pixels in the 8-bit color scheme that simulates a color in the 24-bit color scheme. For example, the 8-bit pixels 820 are arranged in a pattern to simulate the color formed by the 24-bit pixels 800.

Act 406 represents the image print driver 200 performing compression on the master slide and the masks. Because only the master slide and masks are compressed, the resulting compressed file size is smaller than if the entire images were compressed. In some embodiments, LZ-77 type compression is used. LZ-77 compression uses a table-based lookup technique by Abraham Lempel and Jacob Ziv. In particular, LZ-77 compression stores a bit pattern and a code for the bit pattern. When the bit pattern is repeated in a stream of input, only the code is stored, avoiding the need to store the entire bit pattern again. LZ-77 provides lossless compression (i.e., data is not lost during the compression process). In other embodiments, other forms of compression (e.g., JPEG or run length encoding) may be used. For more information on LZ-77, see http://www.rasip.fer.hr/research/compress/algorithms/ftmd/lz/lz77.html, which is entirely incorporated by reference herein.

Act 408 represents the image print driver 200 packing the compressed data into a format that is understood by the mobile computing tool 120 (i.e., a native file transfer format). This may be performed by the Fileout.c code attached in Appendix A. For example, the native file transfer format may be .pdb, which stands for Palm™ database and which is a format understood by a Palm™ OS PDA from Palm, Inc. of Santa Clara, Calif. At this point, the data is ready to be transferred by the transfer software.

Figure 4B:
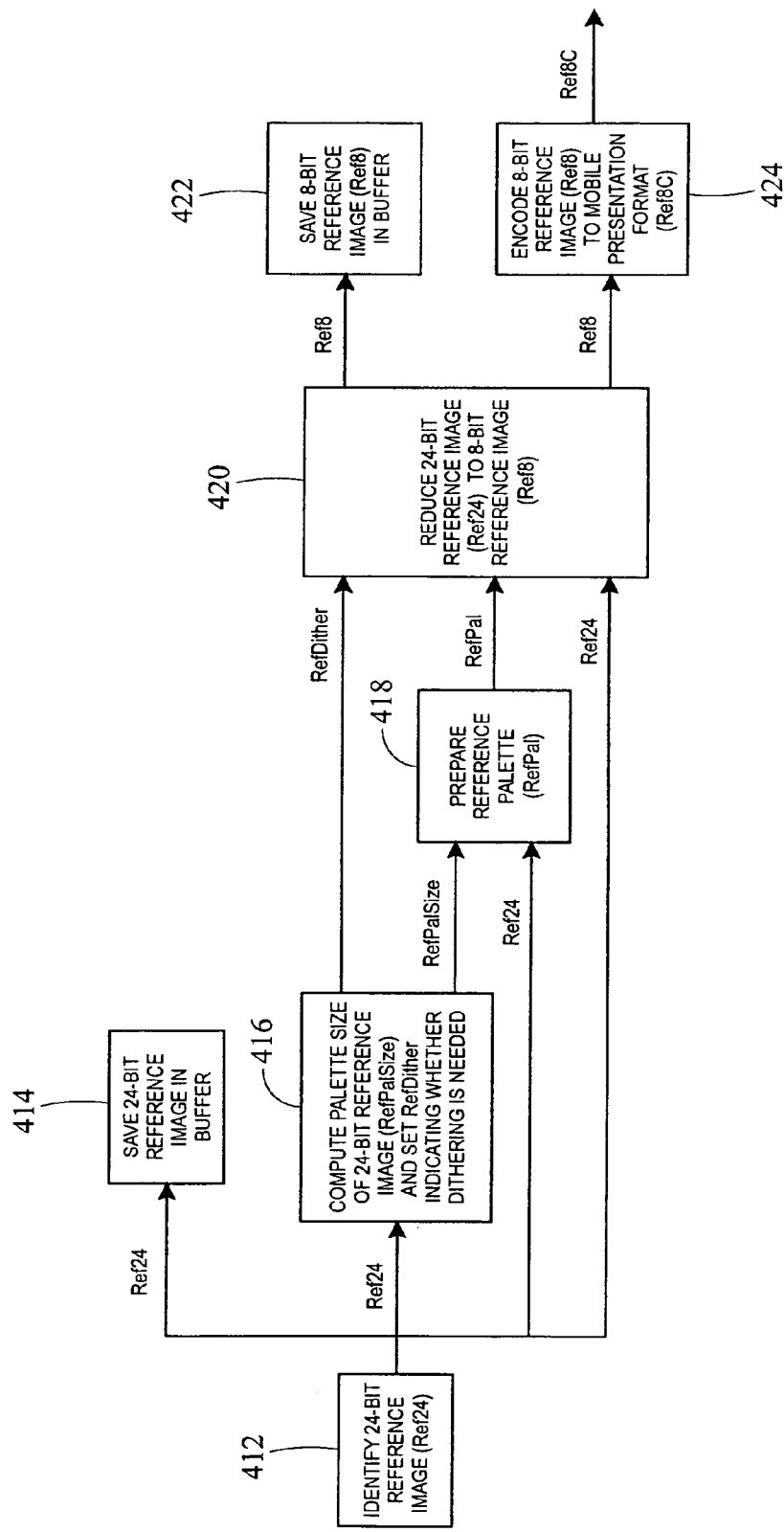
FIGS. 4B–4E illustrate, in block diagrams, acts performed by the psuedocode attached in Appendix B in accordance with some embodiments of the invention to generate a mobile presentation.

FIGS. 4B–4E illustrate, in block diagrams, acts performed by the psuedocode attached in Appendix B in accordance with some embodiments of the invention to generate a mobile presentation. FIG. 4B illustrates, in a block diagram, acts performed by the psuedocode attached in Appendix B to prepare an 8-bit reference image for transfer to a mobile computing tool 120 in accordance with an embodiment of the invention. Initially, a 24-bit reference image (Ref24) is identified (act 412). This may be done, for example, by comparing pixels across a set of images. Each image in the set of images may be referred to as a "target." The 24-bit reference image is saved in a buffer (act 414). This reference image is used to identify 24-bit masks in each target in the set of images.

Additionally, the palette size (i.e., the number of colors) of the 8-bit version of the 24-bit reference image is computed as the maximum of the number of colors in the picture or 128, and it is determined whether dithering is needed (act 416). In particular, in some embodiments in which color reduction to an 8-bit color space will occur, the reference image is assigned a maximum of 128 colors (of the 256 colors in the 8-bit color space), and the target image is assigned the remaining 128 colors (of the 256 colors in the 8-bit color space). In this case, if the palette size of the 8-bit version of the 24-bit reference image exceeds 128, then the value of RefDither is set to true to indicate that dithering is required to represent the colors of the 24-bit reference image with 128 colors.

The reference palette (RefPal) is prepared (act 418) based on the 24-bit reference image and the reference palette size (RefPalSize). The reference palette (Refpal) is the number of colors in the 8-bit version of the reference image. The reference palette is the set of colors used for the 24-bit reference image. In act 420, the 24-bit reference image is reduced to an 8-bit reference image (Ref8) based on inputs of the reference palette (RefPal), the 24-bit reference image (Ref24), and the value of RefDither. The 8-bit reference image is saved in a buffer (act 422). Additionally, the 8-bit reference image is encoded to a mobile presentation format (Ref8C) in act 424.

Figure 4C:
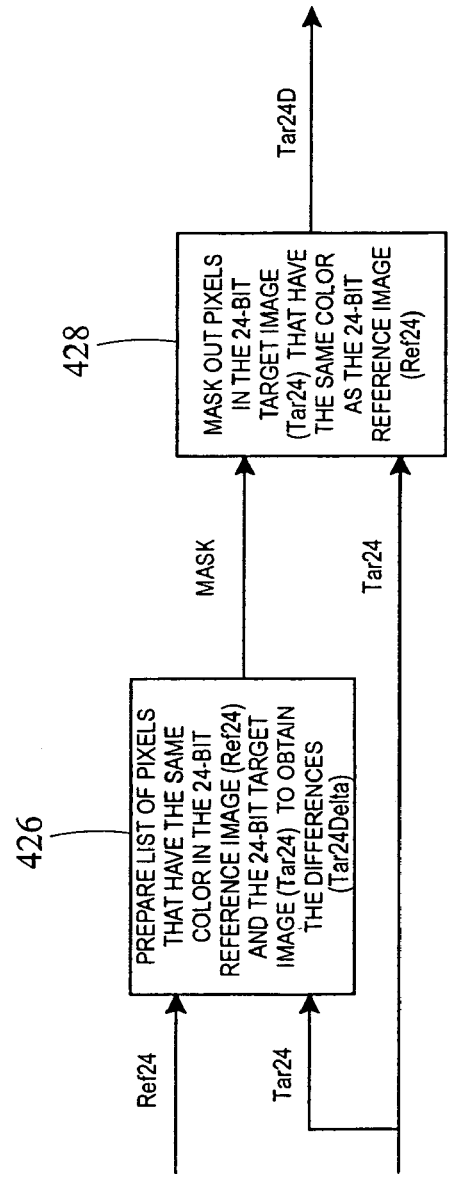

FIG. 4C illustrates, in a block diagram, acts performed by the psuedocode attached in Appendix B to prepare a 24-bit target mask and 24-bit target differences in accordance with an embodiment of the invention. Initially, in act 426, a list of pixels that have the same color in the 24-bit reference image (Ref24) and the 24-bit target image (Tar24) is prepared to obtain the differences between the images (MASK). The pixels in the 24-bit target image that have the same color as in the 24-bit reference image are masked out (act 428). This results in a 24-bit target mask.

Figure 4D:
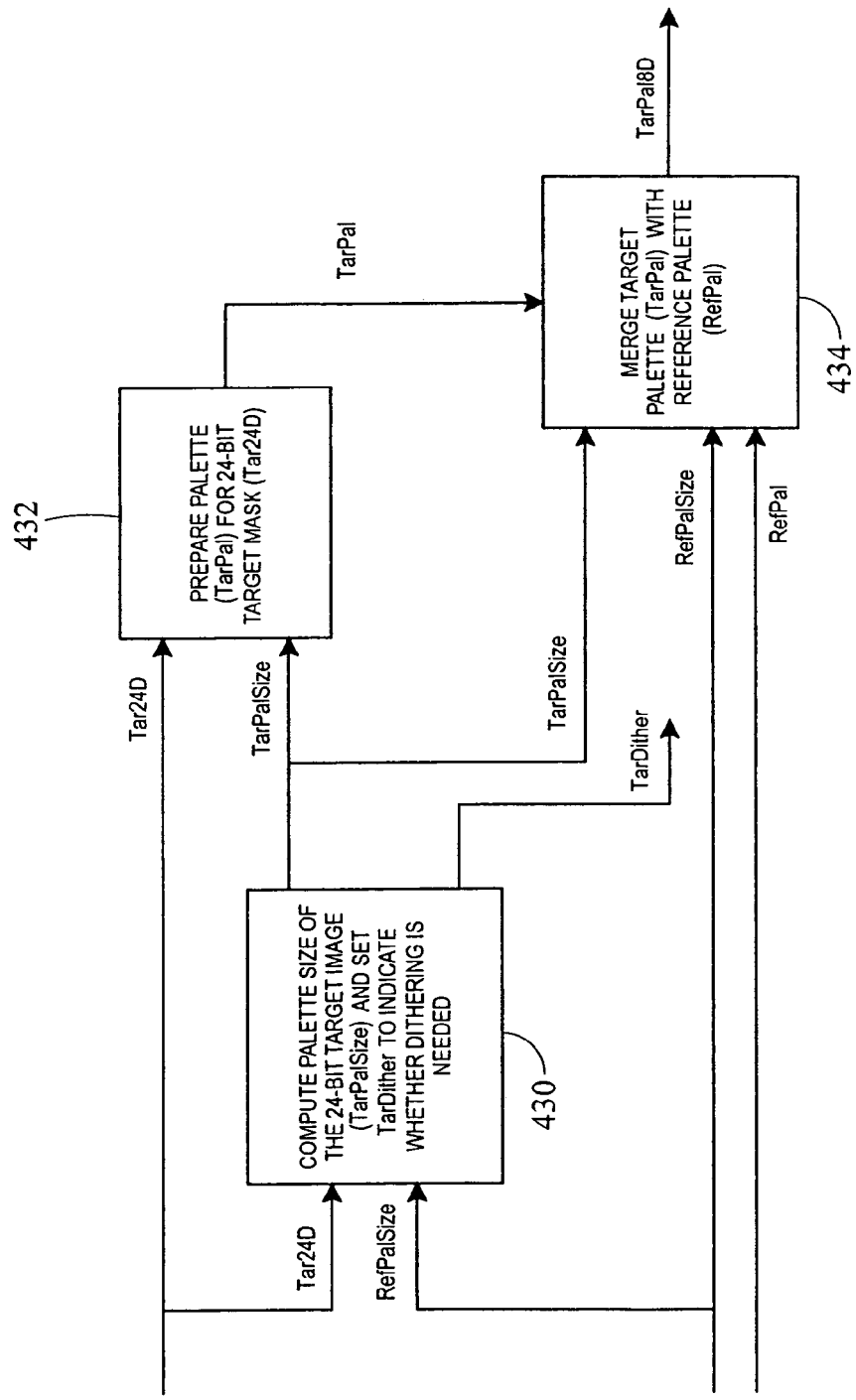

FIG. 4D illustrates, in a block diagram, acts performed by the psuedocode attached in Appendix B to prepare an 8-bit target mask palette in accordance with an embodiment of the invention. In act 430, the palette size (TarPalSize) (i.e., the color palette of the 24-bit target image with pixels common to the 24-bit reference image masked out) is computed and the value of "TarDither" is set. That is, if the palette size of the 8-bit version of the 24-bit reference image exceeds 128, then the value of TarDither is set to true to indicate that dithering is required to represent the colors of the 24-bit reference image with 128 colors. In act 432, the target palette (TarPal) is prepared for the masked 24-bit target image (Tar24D). Then in act 434, the target palette (TarPal) is merged with the reference palette (RefPal) to obtain a merged palette (TarPal8D) used to prepare an 8-bit image of the 24-bit target with pixels common to the 24-bit reference image masked out (Tar24D).

Figure 4E:
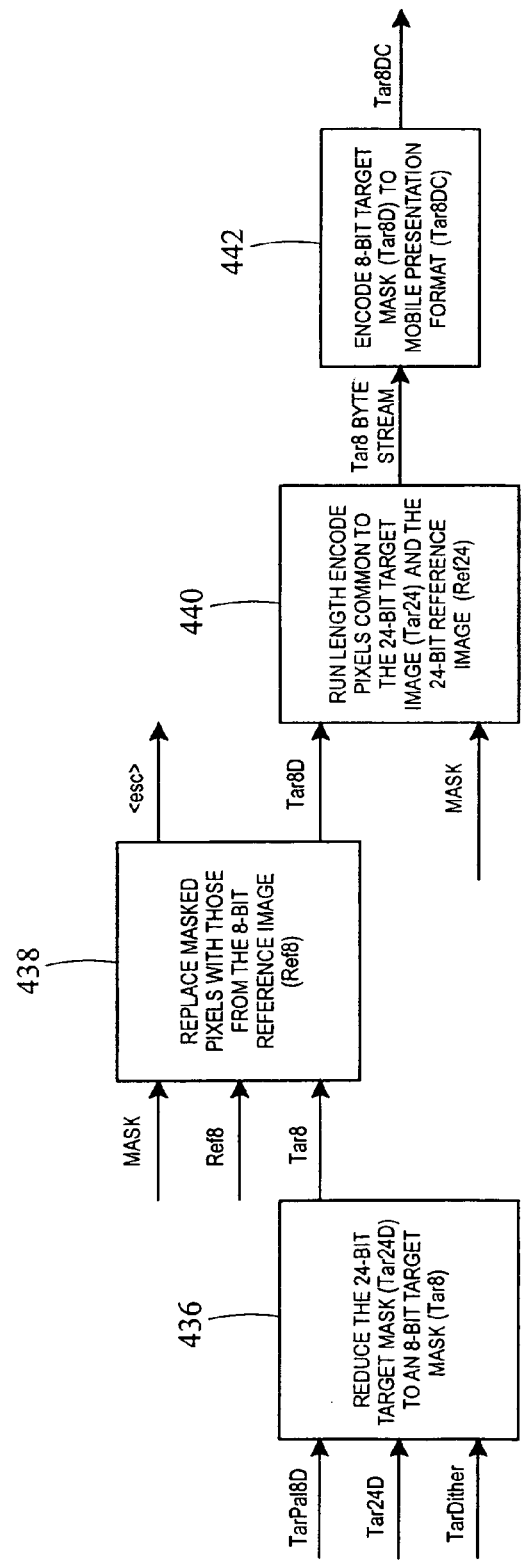

FIG. 4E illustrates, in a block diagram, acts performed by the psuedocode attached in Appendix B to prepare an 8-bit target mask for transfer to a mobile computing tool 120 in accordance with an embodiment of the invention. In act 436, the masked 24-bit target image (Tar24D) is reduced to an 8-bit target image (Tar8) with the inputs of the merged palette (TarPal8D), the masked 24-bit target image (Tar24D), and the value of TarDither. The masked pixels in the 8-bit target mask are replaced with those form the 8-bit reference image (act 438). In particular, act 438 attempts to take care of edge points that may not be in the correct palette when run length encoding occurs because run length encoding is modulo 8. For example, for a row of pixels in positions 0–1023, if the first 5 positions have one color, and the next 100 pixels have another color, then the run length encoding will encode positions 8 onwards with a different palette, leaving the pixels in the sixth and seventh positions potentially having an incorrect palette. Therefore, the pixels in the sixth and seventh positions are set to the corresponding pixels from the reference image. Also in act 438, an <esc> code is computed by finding the least frequently occurring pixel value in Tar8D.

In act 440, run length encoding of pixels common to the 24-bit target image (Tar24) and the 24-bit reference image (Ref24) occurs, resulting in an 8-bit version of the target image with pixels common to the reference image masked out, which will be referred to as the Tar8 Byte Stream. This is coded as follows: If a run of pixels match the corresponding pixels on the previous line, then they are coded as <esc>1<length/8>; else if, a run of pixels that match reference image from Tar24Mask, then they are coded as <esc>2<length/8>; else if, a run of pixels are same value, then they are coded as <esc>3<length/8>; else if, pixels=<esc>, they are coded as <esc>0; else, code is pixel. The run length encoded 8-bit target mask is encoded (eg. LZ-77 encoding) in act 442 to a mobile presentation format (Tar8DC). Then, other targets in the set of images are similarly processed.

Mobile presentations may be generated from any application that has image print driver 200 support or directly from within an application that includes an image plug-in 220.

Figure 9:
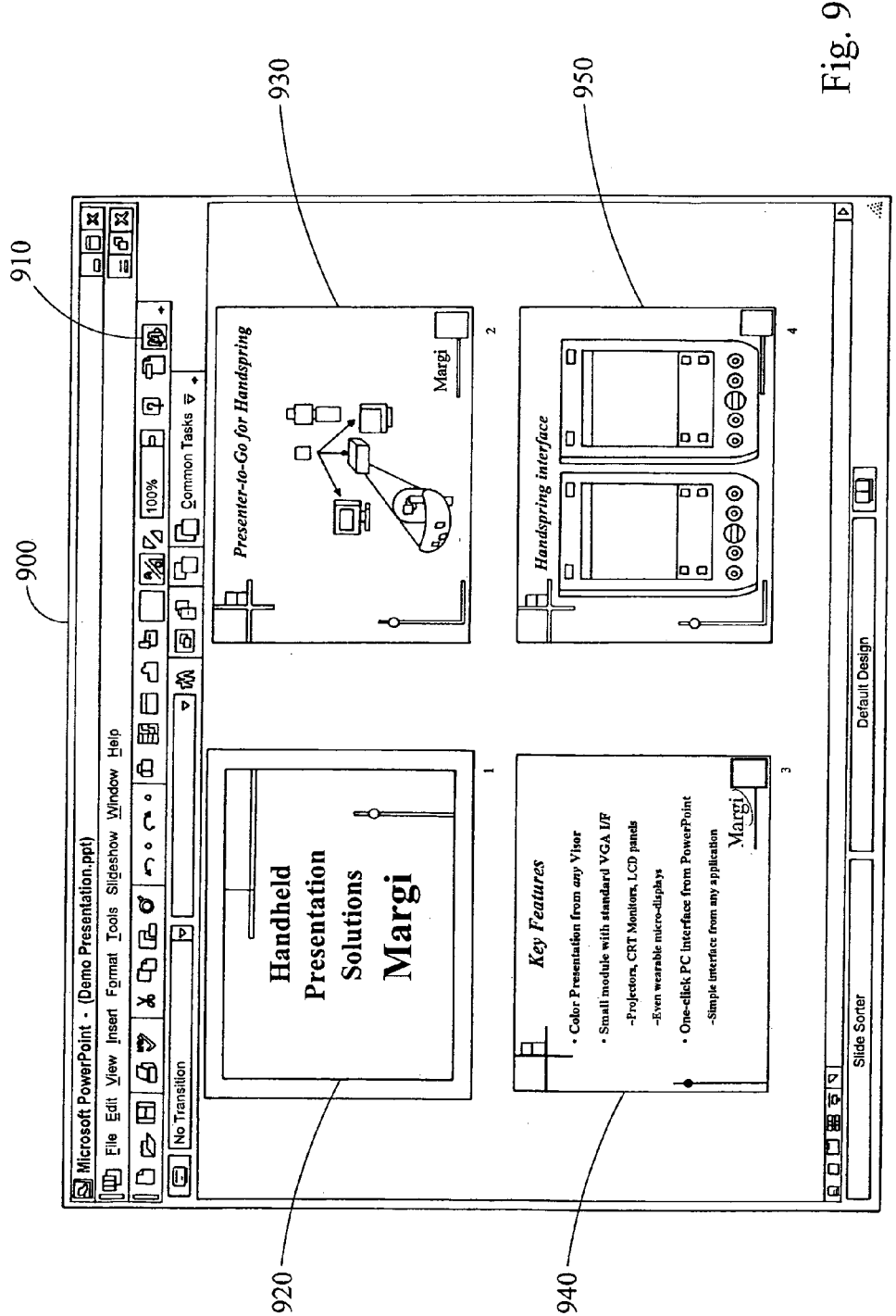
FIG. 9 illustrates, in a block diagram, a PowerPoint® window in accordance with an embodiment of the invention.

In some embodiments, an image plug-in 220 is provided for an application that enables selection of an image icon that automatically converts a document into a mobile presentation. For example, an image plug-in 220 may be provided by the invention that plugs into a PowerPoint® application. FIG. 9 illustrates, in a block diagram, a PowerPoint® window 900 in accordance with an embodiment of the invention. In this case, the image plug-in 220 displays an image icon 910 (such as "M⊃") on the PowerPoint® toolbar. When the image icon is selected, the image print driver 200 automatically converts a each page of a PowerPoint® presentation into a bit map image, generates one or more masters and corresponding sets of masks, optionally performs color reduction using color dithering, compresses the data, and formats the data into a native file transfer format, resulting in a mobile presentation that is ready to be transferred to the mobile computing tool 120. Moreover, the image plug-in 220 extracts features from the PowerPoint® presentation, such as a Slide Title for each slide 920, 930, 940, and 950 in the presentation and Notes associated with each slide 920, 930, 940, and 950 in the presentation.

After the mobile presentation has been generated with the image print driver 200 or the image plug-in 220, a user is given the option of saving the mobile presentation as a new mobile presentation (via a Create command) or appending the new mobile presentation to an existing mobile presentation (via an Append command).

Figure 10:
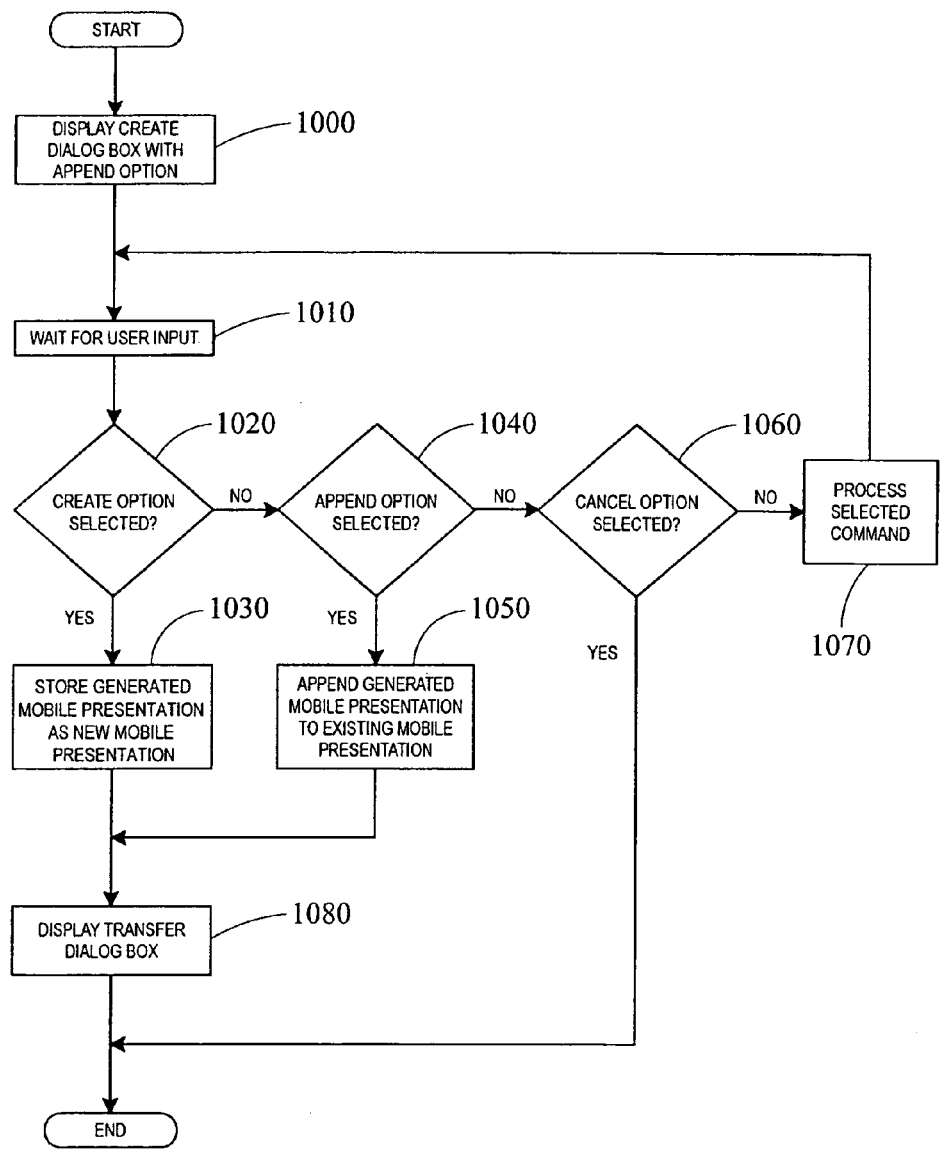
FIG. 10 illustrates, in a flow chart, acts performed by a computer programmed in accordance with some embodiments of the invention to store a mobile presentation as a new mobile presentation or append the mobile presentation to an existing mobile presentation.

FIG. 10 illustrates, in a flow chart, acts performed by a computer programmed in accordance with some embodiments of the invention to store a mobile presentation as a new mobile presentation or append the mobile presentation to an existing mobile presentation.

Figure 11A:
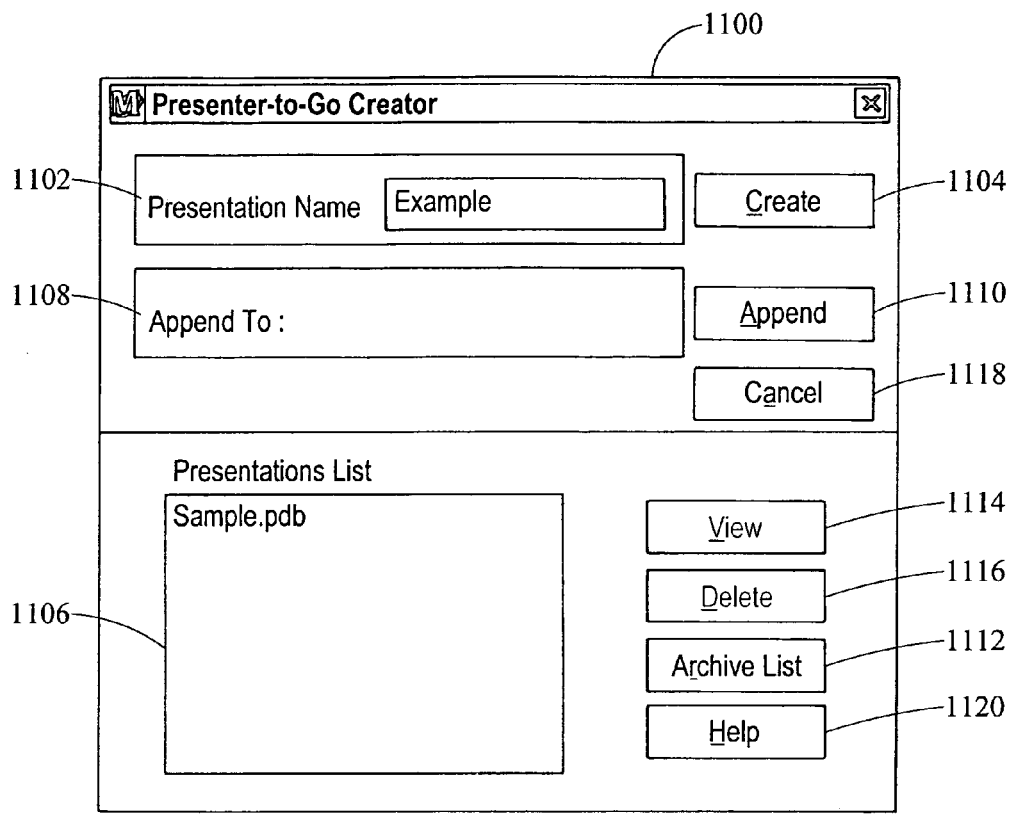
FIGS. 11A and 11B illustrate, in block diagrams, a Create dialog box and an Archive dialog box, respectively, in accordance with an embodiment of the invention.

Act 1000 represents the image print driver 200 displaying a Create dialog box 700 with an append option in response to the print command. FIG. 11A illustrates, in a block diagram, a Create dialog box 1100 in accordance with an embodiment of the invention. The Create dialog box 1100 allows a user to store the generated mobile presentation as a new mobile presentation or to append the generated mobile presentation to an existing mobile presentation. The Create dialog box 1100 is displayed with the name of the mobile presentation taken from the application (e.g., a Microsoft® Word® application) from which a document was printed. The name is displayed in a "Presentation Name" box 1102. Alternatively, if the image-plug-in 220 for a PowerPoint® application was used, the Create dialog box 1100 is displayed with the "Presentation Name" set to the name of the PowerPoint® presentation.

The Create dialog box 1100 allows a user to change the name of the mobile presentation in the "Presentation Name" box 1102. If the user tries to name the mobile presentation with the name of an existing mobile presentation, the image print driver 200 gives the user the option to overwrite or rename it something different. The Create dialog box 1100 also allows a user to store the generated mobile presentation as a new mobile presentation by selecting a "Create" button 1104 or to append the generated mobile presentation to an existing mobile presentation by selecting an "Append" button 1110. Act 1010 represents the image print driver 200 waiting for user input.

Act 1020 represents the image print driver 200 determining whether the "Create" button 1104 has been selected. If the "Create" button 1104 has been selected, processing continues to act 1030, which represents the image print driver 200 storing the generated mobile presentation as a new mobile presentation. If the "Create" button 1104 has not been selected, processing continues to act 1040, which represents the image print driver 200 determining whether the "Append" button 1110 was selected. If the "Append" button 1110 has been selected, processing continues to act 1050, which represents the image print driver 200 appending the generated mobile presentation to an existing mobile presentation selected by a user.

In particular, to append the generated mobile presentation to an existing mobile presentation in the "Presentations List" 1 106, an existing mobile presentation is selected from the "Presentations List" and the name of the selected mobile presentation automatically appears in the "Append To" line 1108. Selecting the "Append" button 1110 appends the generated mobile presentation to the selected mobile presentation listed on the "Append To" line 1108.

A user can view and delete mobile presentations in the "Presentations List" 1106 by using the "View" button 1114 and "Delete" button 1116, respectively.

Figure 11B:
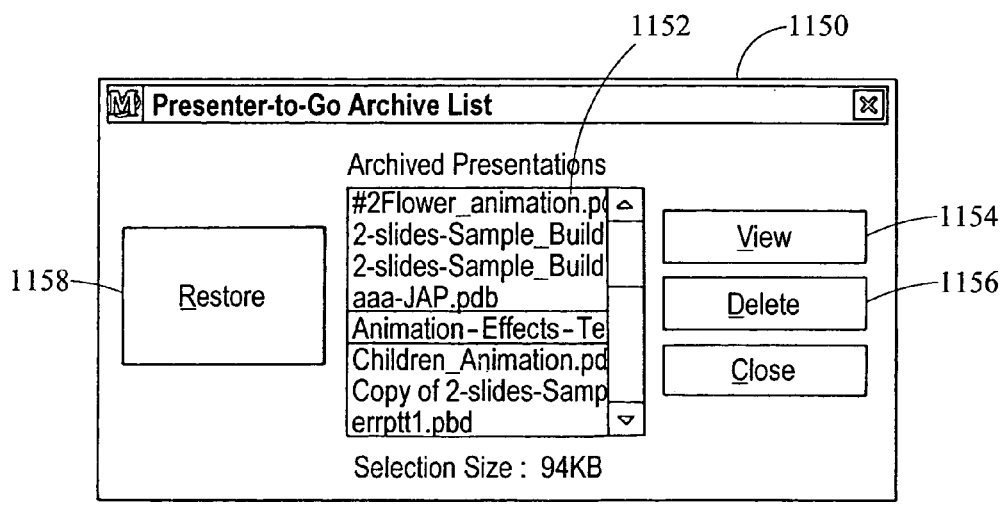

Additionally, mobile presentations previously transferred to the mobile computing tool 120 are saved in an archive list. To append the generated mobile presentation to an archived mobile presentation, the "Archive List" button 1112 is selected. Upon selection of the "Archive List" button 1112, an Archive dialog box 1150 is opened. FIG. 11B illustrates, in a block diagram, an Archive dialog box 1150 in accordance with an embodiment of the invention. A list of archived (i.e., previously transferred) mobile presentations are shown in an "Archived Presentations" list 1152. A user can view or delete archived mobile presentations in the "Archived Presentations" list 1152 by using the "View" button 1154 and "Delete" button 1156, respectively. In some embodiments, the Archive window enables a user to copy an archived mobile presentation to the "Presentations List" 1106 of the Create dialog box 1100 by selecting an archived mobile presentation and a "Restore" button 1158.

If the "Append" button 1110 was not selected in act 1040, processing continues to act 1060, which represents the image print driver 200 determining whether a "Cancel" button 1118 has been selected, and, if so, terminating processing. Otherwise, act 1070 represents the image print driver 200 processing another command (e.g., selection of the "Archive List" button 1112 or "Help" button 1120) and returning to act 1010 to wait for further user input.

Figure 12:
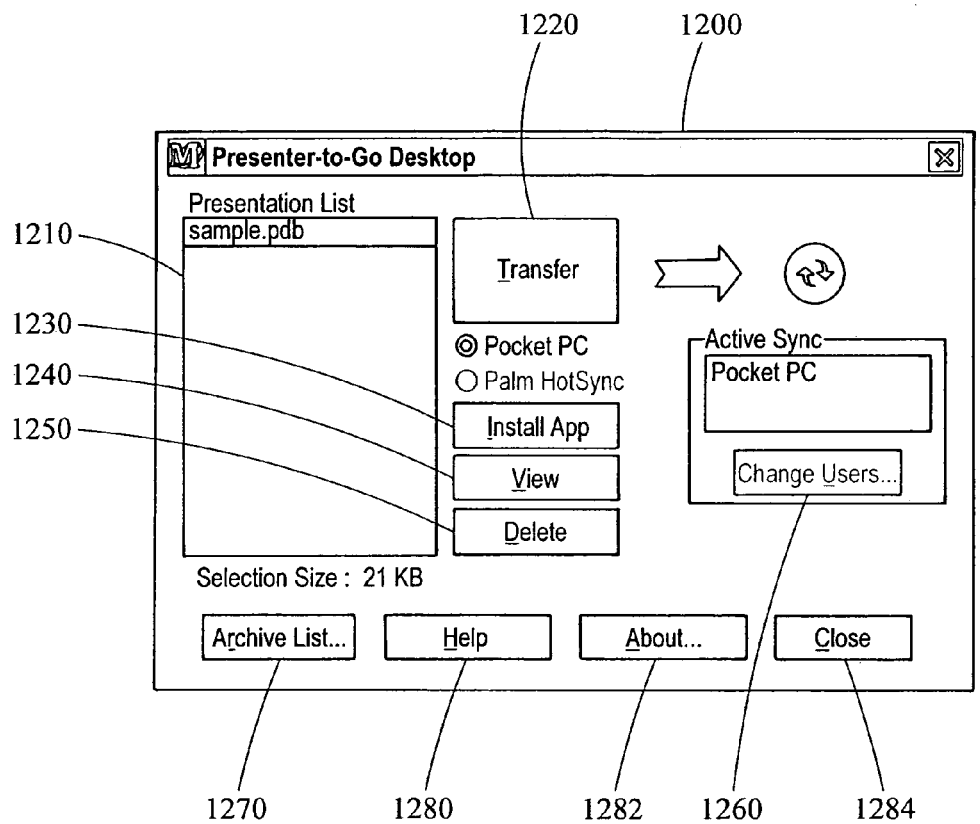
FIG. 12 illustrates, in a block diagram, a Transfer dialog box in accordance with an embodiment of the invention.

After selection of the "Create" button 1104 or the "Append" button 1110, the image print driver 200 displays a Transfer dialog box 1200. FIG. 12 illustrates, in a block diagram, a Transfer dialog box 1200 in accordance with an embodiment of the invention.

Mobile presentations that are ready to be transferred to a mobile computing tool are displayed in a "Presentations List" 1210. A user may select a mobile presentation and the "Transfer" button 1220 to indicate that the mobile presentation is to be transferred. The transfer occurs the next time the transfer software performs a transfer of data to the mobile computing tool. In some embodiments, if the application chooses to make the transfer happen immediately, the application need not wait for the next active synch process to commence. Instead, the application may create its own conduit [what does this mean?] and transfer the slides to the mobile computing tool.

In particular, the "Transfer" button 1220 transfers the selected mobile presentation into the mobile computing tool 120 when the mobile computing tool 120 is connected to the computer 100.

The "Install App" button 1230 installs the slide viewer software onto the connected mobile computing tool 120. The "Install App" button 1230 may also install other software onto the mobile computing tool 120, such as generic drivers or a mirror driver that allows the contents of a screen of the handheld computing tool 120 to be displayed onto a projector. The "View" button 1240 allows a user to view the contents of the selected mobile presentation. The "Delete" button 1250 allows a user to delete the selected mobile presentation. The "Change Users" button 1260 allows a user select which users receive the mobile presentations that are to be transferred on that user's next transfer. If only one user is registered on the mobile computing tool 120, then that user name is automatically placed in the "ActiveSync for these Users" list, which identifies users who should receive a transfer of the selected mobile presentations. The "Archive List" button 1270 provides a list of all mobile presentations that have been previously selected for transfer (i.e., transferred to an ActiveSync® bin).

The "Help" button 1280 opens a Help document providing information for this dialog box. The "About" button 1282 provides the version number of the image print driver software 200 being used. The "Close" button 1284 closes the application.

In some embodiments, buttons in the dialog boxes offer context-sensitive tool-tips (i.e., if a user slides a cursor over the button, an explanation of the button's function is displayed).

With the append option, a user may generate a single mobile presentation by combining mobile presentations generated with documents from multiple applications. The ability to generate a single mobile presentation from multiple applications seamlessly on the computer is one of the advantages of the invention. For example, imagine that the user is making a sales presentation for a Product. The user may do the following to generate a mobile presentation for the Product using multiple applications:

1. The user may generate a Microsoft® PowerPoint® presentation on the computer 100 called "Sales_Prezo", with personal reference notes. The user may select the image icon 910 on the tool-bar, which generates a mobile presentation and displays the Create dialog box 1100. The user may then select the "Create" button 1104, which places the "Sales_Prezo" mobile presentation in the "Presentations List" 1106.
2. The user may then open a Specifications Sheet of the Product (e.g. a Microsoft® Word® document), and "Print" to the image print driver 200, which generates a new mobile presentation for the Specifications Sheet. The user would then select the "Sales_Prezo" presentation in the "Presentations List" 1106, and the "Sales_Prezo" presentation is displayed on the "Append to:" line 1108. At this time, selecting the "Append" button 1110 (instead of the "Create" button 1104) will generate a single mobile presentation in which the Specification Sheet mobile presentation is appended to the "Sales_Prezo" mobile presentation.
3. The user may then open a Pricing Sheet of the Product (e.g., a Microsoft® Excel® spreadsheet), and "Print" to the image print driver 200 to generate a new mobile presentation for the Pricing Sheet. The Create dialog box 1100 is displayed, and the user may select the "Sales_Prezo" mobile presentation in the "Presentations List" 1 106. When the "Append" button 1110 is selected, the Pricing Sheet is appended to the "Sales_Prezo" mobile presentation.
4. The user may also go to any HTML page, and "Print" to the image print driver 200 to generate a new mobile presentation for the HTML page. The Create dialog box 1100 is displayed, and the user may select the "Sales_Prezo" mobile presentation in the "Presentations List" 1106. When the "Append" button 1110 is selected, the HTML page is appended to the "Sales_Prezo" mobile presentation.
5. At this time, the user may view the "Sales_Prezo" mobile presentation by selecting the "View" button 1114, and the user will find that all the slides from different applications are available in one single mobile presentation.

The user may also restore mobile presentations from archived presentations (i.e., in the Archive Presentations list), and append to them. In some embodiments, the user may combine two existing mobile presentations. In some embodiments, slides may be selected from two or more existing mobile presentations on the mobile computing device and stored in a single, new mobile presentation.

In some embodiments, after the mobile presentation has been created or appended, the user may place the mobile computing tool 120 in its cradle 110, activate the transfer software (e.g., ActiveSync® software), and press the "Transfer" button 1220. This transfers the selected mobile presentation to the mobile computing tool.

In some embodiments, if a user has disabled auto syncing, the next time the user manually syncs, the user may access the mobile presentation to be downloaded in an image printer driver program folder.

In some embodiments, the user may wish to disconnect all conduits except the "installer" if the mobile computing tool 120 is used primarily for presentations. This will prevent automatic syncing of other programs each time the user uses transfer software to load mobile presentations onto the mobile computing tool 120. This may be done on the computer 100 by adjusting the "Synchronization Settings," which are part of the transfer software.

The transfer software connects the mobile computing tool 120 to the computer 1100 and imports one or more mobile presentations and any other data that is scheduled for transfer into the mobile computing tool's 120 memory. Then, the mobile computing tool 120 may be removed from the cradle 110 and taken to the location of, for example, a conference.

In some embodiments, the image print driver 200 supports static slides (i.e., does not support any slide-transitions, animation, or audio/video features available in Microsoft® PowerPoint®).

Figure 13A:
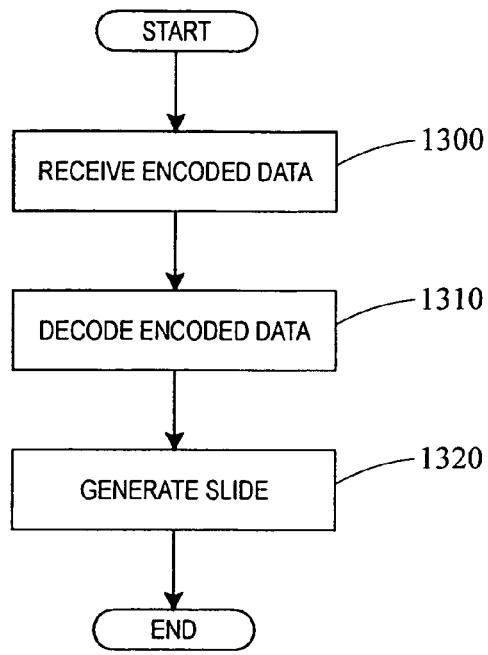
FIG. 13A illustrates, in a flow chart, acts performed by a mobile computing tool programmed in accordance with some embodiments of the invention to generate slides.

FIG. 13A illustrates, in a flow chart, acts performed by a mobile computing tool 120 programmed in accordance with some embodiments of the invention to generate slides. This may be performed by the MGIDDraw.c code attached in Appendix A. Act 1300 represents the slide viewer 250 at the mobile computing tool 120 receiving encoded data. Act 1310 represents the slide viewer 250 decoding the data. In some embodiments, when there are multiple master slides, there may be a code included in the encoded data to identify each master slide. Act 1320 represents the slide viewer 250 generating a slide.

Figure 14:
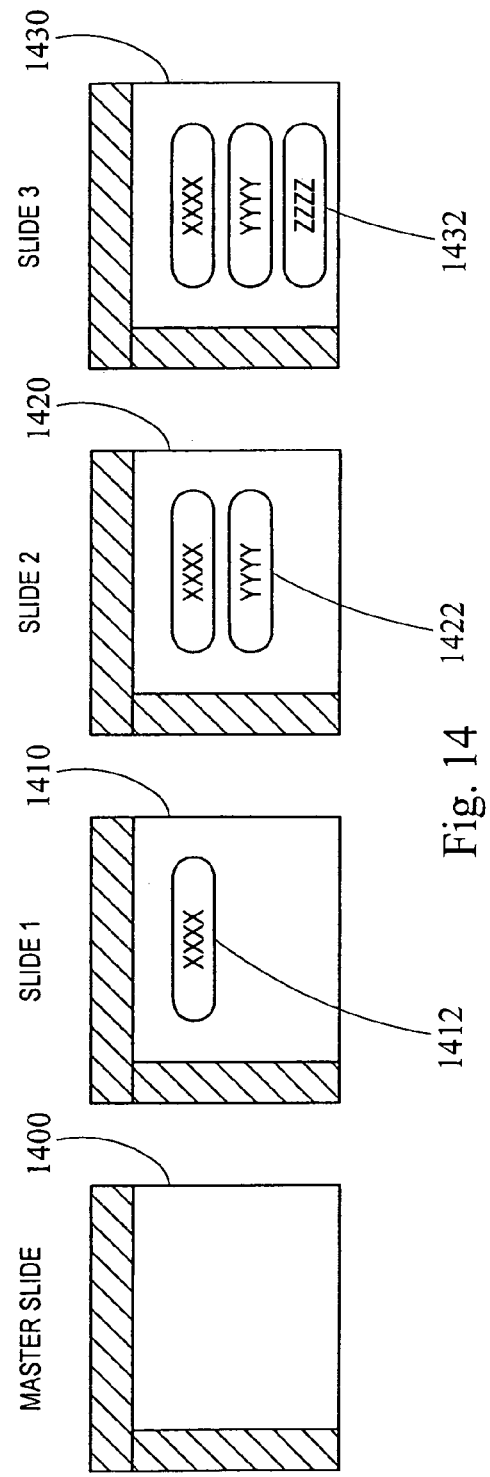
FIG. 14 illustrates, in a block diagram, generation of slides in accordance with an embodiment of the invention.

FIG. 14 illustrates, in a block diagram, generation of slides in accordance with an embodiment of the invention. In particular, a first slide 1410 is generated by applying a first mask 1412 to the master slide 1400. A second slide 1420 is generated by applying the second mask 1422 to the first slide 1410. A third slide 1430 is generated by applying the third mask 14323 to the second slide 1420.

In some embodiments, the reference slide may include the first mask, the second mask, and the third mask. Then, the first slide is created by subtracting the second mask and the third mask from the reference slide. The second slide is created by subtracting the third mask from the reference slide. The third slide is created without subtracting elements from the reference slide.

Figure 13B:
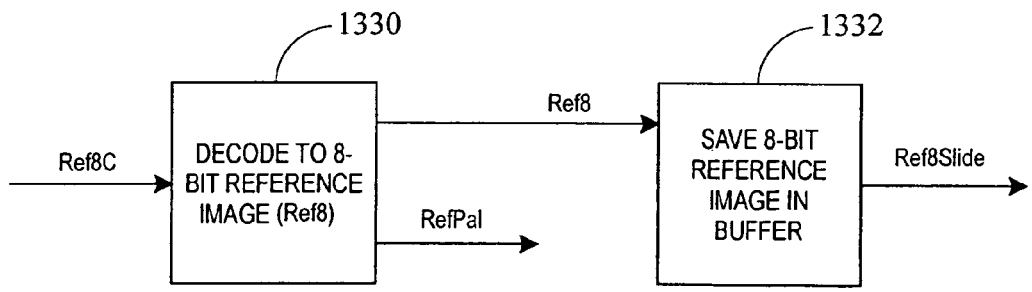
FIGS. 13B–13C illustrate, in block diagrams, acts performed by the psuedocode attached in Appendix B in accordance with some embodiments of the invention to generate slides.
Figure 13C:
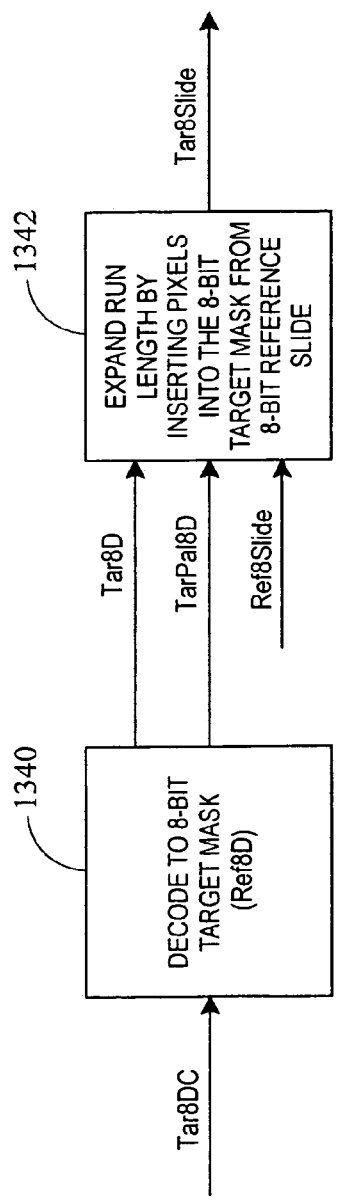

FIGS. 13B–13C illustrate, in block diagrams, acts performed by the psuedocode attached in Appendix B in accordance with some embodiments of the invention to generate slides. FIG. 13B illustrates, in a block diagram, acts performed by the psuedocode attached in Appendix B to generate an 8-bit reference slide at a mobile computing tool 120 in accordance with an embodiment of the invention. At the mobile computing tool 120, when an 8-bit reference image in a mobile presentation format (Ref8C) is received, it is decompressed and decoded to separate the 8-bit reference image (Ref8) from the reference palette (RefPal) (act 1330). This 8-bit reference image (Ref8) is saved in a buffer for use in creating target images and is referred to as an 8-bit reference slide (Ref8Slide) (act 1332).

FIG. 13C illustrates, in a block diagram, acts performed by the psuedocode attached in Appendix B to generate an 8-bit target slide at a mobile computing tool 120 in accordance with an embodiment of the invention. An 8-bit target mask in a mobile presentation format (Tar8DC) is decompressed and decoded to obtain a masked 8-bit target image (Tar8D) and a merged palette (TarPal8D) (act 1340). Then, in act 1342, the run length encoding is expanded by inserting pixels into the masked 8-bit target image (Tar8D) from the 8-bit reference slide (Ref8Slide) based on the merged palette (TarPal8D), which results in an 8-bit target slide (i.e., image) that is displayed on the mobile computing tool 120.

Figure 15:
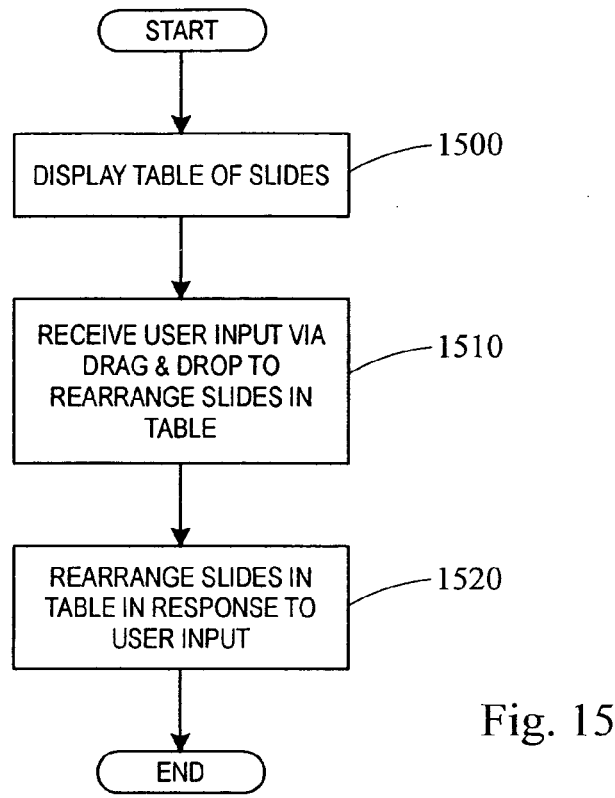
FIG. 15 illustrates, in a flow chart, acts performed by a mobile computing tool programmed in accordance with some embodiments of the invention to reorder a table of slides.

FIG. 15 illustrates, in a flow chart, acts performed by a mobile computing tool 120 programmed in accordance with some embodiments of the invention to reorder a table of slides. Act 1500 represents the slide viewer 250 displaying a table of slides. Act 1510 represents the slide viewer receiving user input via drag and drop selections to rearrange slides in a table. In particular, the user can reorganize slide order by selecting a slide and dragging and dropping it at another location in the table. Act 1520 represents the slide viewer 250 rearranging the slides in the table in response to the user input.

Figure 16:
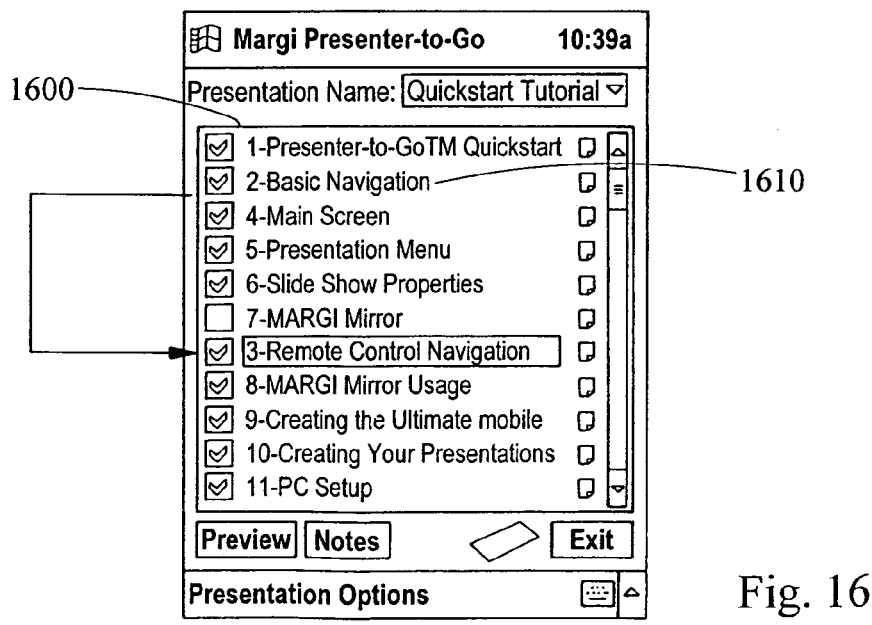
FIG. 16 illustrates, in a block diagram, a table of slides on a mobile computing tool.

FIG. 16 illustrates, in a block diagram, a table of slides 1600 on a mobile computing tool 120. The table of slides 1600 may be part of the mobile presentation that is downloaded to the mobile computing tool 120. The table of slides 1600 controls the order of presentation of the numbered slides. If the table of slides 1600 is reordered, then the presentation of the slides are reordered. In the table of slides, 1600, the "Basic Navigation" slide 1610 is being moved down from the third to the eighth position in the table 1600.

Once the images have been transferred to the mobile computing tool 120, a user may present the images during a conference.

Microsoft, Word, PowerPoint, Excel, ActiveSynch, Windows XP, Windows 98, Windows 98SE, Windows 2000, Windows Millennium, Windows NT, Windows CE, and Pocket PC are trademarks of Microsoft, Inc. of Redmond, Wash. Pentium is a trademark of Intel, Corp., Santa Clara, Calif. UltraSparc is a trademark of Sun Microsystems, Inc. of Mountain View, Calif. RS6000 is a trademark of IBM of Armonk, N.Y. Macintosh is a trademark of Apple Computer of Cupertino, Calif. Palm is a trademark of Palm, Inc. of Santa Clara, Calif. Adobe, Acrobat, and Reader are trademarks of Adobe Systems, Inc. of Seattle, Wash. Handspring is a trademark of Handspring, Inc. of Mountain View, Calif.). Jornada 720 and Jornada 790 are trademarks of Hewlett Packard Co. of Palo Alto, Calif. iPAQ is a trademark of Compaq Computer Corp. of Houston, Tex. PC-Ephone is a trademark of PC-EPhone of San Diego, Calif. Symbian is a trademark of Symbian, Ltd. of London, UK.

Although the invention has been described with reference to particular embodiments, the description is only an example of the invention's application and should not be taken as a limitation.

Additionally, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media. Using the present specification, the invention may be implemented as a machine, process, or article of manufacture by using programming and/or engineering techniques to produce software, firmware, hardware, or any combination thereof.

Various other adaptations and combinations of features of the embodiments disclosed are within the scope of the invention as defined by the following claims.

APPENDIX A

See Attached CD-ROM Copy 1 and Copy 2

APPENDIX B

```
/***********************************************************************
/
Notes:
-------
Ref24        24 bit Reference Image (slide master)
Ref8         8 bit version of Reference Image
Ref8C        8 bit version of Reference Image converted to .MIG format
RefPal       Ref8 color palette
RefPalSize   Number of colors in Ref8
Ref24Img     Buffer to save Ref24 Image
Ref8Img      Buffer to save Ref8 linage
Tar24        24 bit Target Image (slide)
Tar24Delta   Delta list of common pixels between Tar24 and Ref24
Tar24D       24 bit Target with pixels common to Ref24 masked out
TarS         8 bit version of Target Image
Tar8D        8 bit version of Target Image with pixels common to Ref8 masked
Tar8DC       8 bit version of Target with pixels common to Ref8 run length encoded
             and converted to .MIG format
TarPal       Tar24D color palette
TarPal8D     Merged palette used to prepare 8 bit image of Tar24D
/***********************************************************************
/
int bmpToMigReference (char* szFileIn, char* szFileOut, int refBufNo)
{
    //Conversion of a 24 bit Reference Image (slide master) to .MIG format
    //---------------------------------------------------------------
    //a.  Save Ref24 image in reference buffer
    //b.  Determine number of colors in Ref24 (refColorCount)
    //c.  Select reference palette size (RefPalSize) based on refColorCount
```

-continued

```
    //d.  Prepare 8 bit palette (RefPal) of RefPalSize colors
    //e.  Select Dither
    //f.  Reduce Ref24 to Ref8 using RefPal
    //e.  Encode Ref8 to .MIG format
    BITMAPHANDLE    srcBitmap;
    int                     RefPalSize, refColorCount;
    //   Load file into Bitmap
    loadImage (szFileIn, &srcBitmap);
    // Save image in reference buffer
    saveImgInRefBuffer (bitmapImageAddress (&srcBitmap), refBufNo);
    // Get Number of colors in original image
    L_GetBitmapColorCount (&srcBitmap, &refColorCount);
    RefPalSize = selectReferencePaletteSize (refColorCount);
    prepare8BitPalette (&srcBitmap, RefPalSize);
    // Select Dither
    if(RefPalSize < refColorCount)
        ditherFlag = CRF_ORDEREDDITHER1NG;
    else
        ditherFlag = CRF_NODITHERTNG;
    // Reduce to 8 bit image with RefPalSize colors
    L_ColorResBitmap (&srcBitmap, &srcBitmap, 8,
                        CRF_USERPALETTE|ditherFlag, palette, NULL,
RefPalSize, NULL, NULL);
    // Compress image into .mig format
    encodeToMig(bitmapImageAddress (&srcBitmap), palette,
imageSize(&srcBitmap), szFileOut);
    saveImg8InRefBuffer (bitmapImageAddress (&srcBitmap), refBufNo);
    savePaletteInRefBuffer (palette, retBufNo);
    savePaletteSizeInRefBuffer (RefPalSize, retButNo);
    return (1);
}// jut bmpToMigReference ( )
/*****************************************************************/
int bmpToMigTarget(char* szFileIn,char* szFileOt, int refBufInNum)
{
    //Conversion of a 24 bit Target Image (slide) to .MIG format using Reference
Image
    //-----------------------------------------------------------------------------
    //a.  Prepare mask of pixels common to Ref24 and Tar24
    //b.  Mask out pixels common to Ref24 (Tar24D)
    //c.  Prepare 8 bit palette of 256 - RefPalSize colors from Tar24D (TarPal)
    //d.  Merge RefPal and TarPal into Tar8Pal
    //e.  Select Dither
    //f.  Reduce Tar24D to 8 bits using TarPal8D
    //g.  Replace masked pixels with those from Ref8
    //h.  Replace pixels common with Ref8 with run length encoding (Tar8D)
    //i.  Encode ot .MIG format
    BITMAPHANDLE srcBitmap;
    int                     j, nColors, imgSize, refPaletteSize;
    unsigned char *deltaList, refPixPtr, *srcPixPtr, *deltaImage;
    loadImage (szFilefn, &srcBitmap);
    // This slide needs a reference slide
    // Prepare delta structure between refImage and this image
    refPixPtr = getRefImage(refBufInNum);
    srcPixPtr = bitmapImageAddress (&srcBitmap);
    deltaList = malloc (getimageSize (&srcBitmap));
    imgSize = imageSize (&srcBitmap);
    prepDeltaBuffer (refPixPtr, srcPixPtr, &deltaList, imgSize, getBitsPerPixel
(&srcBitmap));
    // Prepare masked Image
    maskOutCommonPixels (&srcBitmap, deltaList);
    //       Prepare palette
    L_GetBitmapColorCount (&srcBitmap, &colorCount);
    refPaletteSize = getRefPaletteSize (refBufInNum);
    nColors = 256 - refPaletteSize;
    prepare8BitPalette (&srcBitmap, nColors, palette);
    mergeWithReferencePalette (palette, getReferencePalette(refBufInNum), nColors,
refPaletteSize);
    // Select Dither
    if(colorCount > 256)
        ditherFlag = CRF_ORDEREDDITHERING;
    else
        ditherFlag = CRF_NODITHERING;
    // Reduce to 8 bit image with 256 colors
    L_ColorResBitmap (&srcBitmap, &srcBitmap, 8,
                        CRF_USERPALETTE|ditherFlag, palette, NULL, 256,
NULL, NULL);
    // Replace common pixels with those from Ref8
    refPixPtr = getRefImage8(refBufInNum);
    srcPixPtr = bitmapImageAddress (&srcBitmap);
```

-continued

```
        for (j = 0; j < imgSize; j++)
        {
            if (deltaList[j])
            {
                // Replace all pixels of that color with reference image color
                srcPixPtr[j] = refPixPtr[j];
            }
        }
        // Replace common pixels with run length encoding
        deltaImage = malloc (getImageSize (&srcBitmap));
        replaceCommonPixels (&srcBitmap, deltaList, deltaImage);
        // Compress image into .mig format
        encodeToMig(deltaImage, palette, imageSize(&srcBitmap), szFileOut);
        free (deltaList);
        free (deltaImage);
        return (1);
}// int bmpToMigTarget ( )
/************************************************************************/
int migToBmp8Reference (unsigned char* mig, unsigned char* img, unsigned char
*RefPal,
                                int refBufNo)
{
        //Conversion of a 8 bit .MIG to 8 bit Reference Image (slide master)
        //-----------------------------------------------------------------
        //a.  Decode .MIG to Ref8
        //b.  Save Ref8 image in reference buffer
        int       width, height;
        // Decode .mig to Ref8
        decodeMig(mig, img, RefPal, &width, &height);
        // Save Ref8 in reference buffer
        saveImg8InRefBuffer (img, refBufNo);
        return (1);
}// int migToBmp8Reference ( )
/************************************************************************
/
int migToBmp8Target (unsigned char* mig, unsigned char* tar8, unsigned char *tarPal,
                                int refBufNo)
{
        //Conversion of a 8 bit .MIG to 8 bit Target Image
        //------------------------------------------------
        //a.  Decode .MIG to Tar8D
        //b.  Expand run length encoding of pixels common to Ref8 to generate Tar8
        int               width, height;
        unsigned char *refImg;
        // Decode .mig to img
        img = malloc (getMigImgSize (mig));
        decodeMig(mig, img, tarPal, &width, &height);
        // Expand run length encoding of pixels common with Ref8
        refImg = getRefImage8 (refBufNo);
        expandRunLength (img, refImg, tar8, width, height);
        free (img);
        return (1);
}// int migToBmp8Target ( )
```

We claim:

1. A method using a computerized device for presenting images, the method comprising:

generating a presentation, the presentation comprising at least a first image and a second image for viewing in series, the first and second images comprises images for an entire image viewing plane;

partitioning the image viewing plane for the first image into at least two sections, a first section comprising a master slide including at least one common element from the first and second images, a second section comprising a first mask for the first image;

partitioning the image viewing plane of the second image into a second mask;

compressing the master slide, the first mask, and the second mask;

transmitting the compressed master slide, the first mask, and the second mask to a handheld;

decompressing the compressed master slide, first mask, and second mask;

generating a first rebuilt image for the entire image viewing plane for presentation using the handheld, the first rebuilt image comprising a first rebuilt section based on the decompressed master slide and a second rebuilt section based on the decompressed first mask; and generating a second rebuilt image for the entire image viewing plane based on the decompressed second mask.

2. The method of claim 1, where partitioning the image viewing plane of the first image into at least two sections comprises:

comparing pixels in the first image with pixels in the second image; and selecting the pixels that are common to the first and second image for the master slide.

3. The method of claim 2, where comparing pixels comprises comparing color of the pixels in the first image with color of the pixels in the second image.

4. The method of claim 1, further comprising packing the compressed master slide, the first mask, and the second mask into a format understood by a handheld.

5. The method of claim 1, further comprising storing the decompressed master slide; and
where generating a first rebuilt image comprises:
generating the first rebuilt section using the stored decompressed master slide;
generating the second rebuilt section using the decompressed first mask; and
combining the first rebuilt section and second rebuilt section to generate the first rebuilt image that covers the entire image viewing plane.

6. The method of claim 5, where the second rebuilt image comprises the first rebuilt section and a third rebuilt section; and
where generating a second rebuilt image comprises generating the third rebuilt section using the decompressed second mask.

7. The method of claim 6, where generating a second rebuilt image further comprises:
generating the first rebuilt section using the stored decompressed master slide; and
combining the first rebuilt section and third rebuilt section to generate the second rebuilt image.

8. The method of claim 1, where the presentation comprises a first image and subsequent images;
where a first mask and subsequent masks are generated; and
where generating rebuilt subsequent images comprises applying each subsequent mask to each previously built slide to build remaining slides in the presentation.

9. The method of claim 1, further comprising reducing a color scheme of at least one of the master slide, the first mask, or the second mask.

10. The method of claim 9, where reducing the color scheme comprises using a color dithering technique.

11. The method of claim 1, where generating a second rebuilt image for the entire image viewing plane based on the decompressed second mask comprises generating a second rebuilt image based on the decompressed second mask and the decompressed master slide.

12. The method of claim 1, where generating a second rebuilt image for the entire image viewing plane based on the decompressed second mask comprises applying the decompressed second mask to the first rebuilt image.

13. The method of claim 1, where the first and second images comprise first and second bitmap images;
where partitioning the image viewing plane for the first image into at least two sections comprises partitioning the first bitmap image into a first section bitmap image and a second section bitmap image, the first section bitmap image comprising the master slide and the second section bitmap image comprising the first mask.

14. The method of claim 1, where the first and second image are viewed on a display; and
where the entire image viewing plane comprises an entirety of the display.

15. A system for providing compressed image data for display on a handheld, the system comprising logic for:
generating a presentation, the presentation comprising at least a first image and a second image for viewing in series, the first and second images comprises images for an entire image viewing plane;
partitioning the image viewing plane for the first image into at least two sections, a first section comprising a master slide including at least one common element from the first and second images, a second section comprising a first mask for the first image;
partitioning the image viewing plane of the second image into a second mask;
compressing the master slide, the first mask, and the second mask;
transmitting the compressed master slide, the first mask, and the second mask to a handheld;
decompressing the compressed master slide, first mask, and second mask;
generating a first rebuilt image for the entire image viewing plane for presentation using the handheld, the first rebuilt image comprising a first rebuilt section based on the decompressed master slide and a second rebuilt section based on the decompressed first mask; and
generating a second rebuilt image for the entire image viewing plane based on the decompressed second mask.

16. The system of claim 15, where the logic for partitioning the image viewing plane of the first image into at least two sections comprises logic for:
comparing pixels in the first image with pixels in the second image; and
selecting the pixels that are common to the first and second image for the master slide.

17. The system of claim 16, where the logic for comparing pixels comprises logic for comparing color of the pixels in the first image with color of the pixels in the second image.

18. The system of claim 15, further comprising logic for packing the compressed master slide, the first mask, and the second mask into a format understood by a handheld.

19. The system of claim 15, further comprising logic for storing the decompressed master slide; and
where the logic for generating a first rebuilt image comprises logic for:
generating the first rebuilt section using the stored decompressed master slide;
generating the second rebuilt section using the decompressed first mask; and
combining the first rebuilt section and second rebuilt section to generate the first rebuilt image that covers the entire image viewing plane.

20. The system of claim 19, where the second rebuilt image comprises the first rebuilt section and a third rebuilt section; and
where the logic for generating a second rebuilt image comprises logic for generating the third rebuilt section using the decompressed second mask.

21. The system of claim 20, where the logic for generating a second rebuilt image further comprises logic for:
generating the first rebuilt section using the stored decompressed master slide; and
combining the first rebuilt section and third rebuilt section to generate the second rebuilt image.

22. The system of claim 15, where the presentation comprises a first image and subsequent images;
where a first mask and subsequent masks are generated; and
where the logic for generating rebuilt subsequent images comprises logic for applying each subsequent mask to each previously built slide to build remaining slides in the presentation.

23. The system of claim 15, further comprising logic for reducing a color scheme of at least one of the master slide, the first mask, or the second mask.

24. The system of claim 23, where the logic for reducing the color scheme comprises logic for using a color dithering technique.

25. The system of claim 15, where the logic for generating a second rebuilt image for the entire image viewing plane based on the decompressed second mask comprises logic for generating a second rebuilt image based on the decompressed second mask and the decompressed master slide.

26. The system of claim 15, where the logic for generating a second rebuilt image for the entire image viewing plane based on the decompressed second mask comprises logic for applying the decompressed second mask to the first rebuilt image.

27. The system of claim 15, where the first and second images comprise first and second bitmap images;
where the logic for partitioning the image viewing plane for the first image into at least two sections comprises logic for partitioning the first bitmap image into a first section bitmap image and a second section bitmap image, the first section bitmap image comprising the master slide and the second section bitmap image comprising the first mask.

28. The system of claim 15, where the first and second image are viewed on a display; and
where the entire image viewing plane comprises an entirety of the display.

29. A system for providing compressed image data for display on a handheld, the system comprising:
means for generating a presentation, the presentation comprising at least a first image and a second image for viewing in series;
means for partitioning the image viewing plane for the first image into at least two sections, a first section comprising a master slide including at least one common element from the first and second images, a second section comprising a first mask for the first image;
means for partitioning the image viewing plane of the second image into a second mask;
means for compressing the master slide, the first mask, and the second mask;
means for transmitting the compressed master slide, the first mask, and the second mask to a handheld;
means for decompressing the compressed master slide, first mask, and second mask;
means for generating a first rebuilt image for the entire image viewing plane for presentation using the handheld, the first rebuilt image comprising a first rebuilt section based on the decompressed master slide and a second rebuilt section based on the decompressed first mask; and
means for generating a second rebuilt image based on the decompressed second mask.

30. The system of claim 29, where the means for partitioning the image viewing plane of the first image into at least two sections comprises:
means for comparing pixels in the first image with pixels in the second image; and
means for selecting the pixels that are common to the first and second image for the master slide.

31. The system of claim 30, where the means for comparing pixels comprises means for comparing color of the pixels in the first image with color of the pixels in the second image.

32. The system of claim 31, further comprising means for reducing a color scheme of at least one of the master slide, the first mask, or the second mask.

33. The system of claim 32, where the means for reducing the color scheme comprises means for color dithering.

34. The system of claim 33, where the first and second images comprises images for an entire image viewing plane;
where the first rebuilt image is for the entire image viewing plane; and
where the second rebuilt image is for the entire image viewing plane.

* * * * *